(12) United States Patent
Li et al.

(10) Patent No.: US 11,388,109 B2
(45) Date of Patent: Jul. 12, 2022

(54) HIERARCHICAL CAPACITY MANAGEMENT IN A VIRTUALIZATION ENVIRONMENT

(71) Applicant: AT&T Intellectual Property I, L.P., Atlanta, GA (US)

(72) Inventors: Zhi Li, Palo Alto, CA (US); Raghvendra Savoor, Walnut Creek, CA (US); Frederick Armanino, Milton, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 58 days.

(21) Appl. No.: 16/704,951

(22) Filed: Dec. 5, 2019

(65) Prior Publication Data
US 2021/0176192 A1    Jun. 10, 2021

(51) Int. Cl.
| | |
|---|---|
| G06F 9/455 | (2018.01) |
| G06F 9/46 | (2006.01) |
| G06F 9/50 | (2006.01) |
| H04L 12/46 | (2006.01) |
| H04L 47/70 | (2022.01) |
| H04L 47/78 | (2022.01) |
| H04L 41/5009 | (2022.01) |
| H04L 47/125 | (2022.01) |
| H04L 47/762 | (2022.01) |

(52) U.S. Cl.
CPC ........ *H04L 47/823* (2013.01); *H04L 41/5012* (2013.01); *H04L 47/125* (2013.01); *H04L 47/762* (2013.01); *H04L 47/781* (2013.01)

(58) Field of Classification Search
None
See application file for complete search history.

(56) References Cited

U.S. PATENT DOCUMENTS

| | | | |
|---|---|---|---|
| 8,856,797 B1 * | 10/2014 | Siddiqui | G06F 11/34 |
| | | | 718/104 |
| 9,483,299 B2 * | 11/2016 | Sivasubramanian | ......... |
| | | | G06F 11/301 |
| 10,097,421 B1 | 10/2018 | Rajagopal et al. | |

(Continued)

FOREIGN PATENT DOCUMENTS

| | | |
|---|---|---|
| EP | 3021521 A1 | 5/2016 |
| WO | 2016058318 A1 | 4/2016 |

(Continued)

*Primary Examiner* — Nicholas R Taylor
*Assistant Examiner* — Ho T Shiu

(57) ABSTRACT

In one example, a processing system may support capacity management in a virtualization environment based on hierarchical capacity management. The processing system may maintain a policy for a first capacity agent at a first hierarchical layer. The policy may include a set of key capacity indicators, a capacity limit, and an algorithm. The processing system may obtain, based on the set of key capacity indicators, a set of key capacity indicator information. The processing system may monitor, based on the capacity limit, for a detection of a capacity limit event. The processing system may determine, based on the algorithm, a predicted capacity exhaustion point. The processing system may send, toward a second capacity agent at a second hierarchical layer that is above the first hierarchical layer, the set of key capacity indicator information and the predicted capacity exhaustion point.

20 Claims, 4 Drawing Sheets

(56) References Cited

U.S. PATENT DOCUMENTS

| | | | |
|---|---|---|---|
| 2012/0109852 A1* | 5/2012 | Lingam | H04L 47/125 |
| | | | 705/400 |
| 2015/0124622 A1* | 5/2015 | Kovvali | H04L 47/125 |
| | | | 370/236 |
| 2016/0335111 A1 | 11/2016 | Bruun et al. | |
| 2017/0150399 A1 | 5/2017 | Kedalagudde et al. | |
| 2017/0373938 A1 | 12/2017 | Raether et al. | |
| 2018/0013656 A1 | 1/2018 | Chen | |
| 2018/0300638 A1* | 10/2018 | Chen | G06N 3/006 |
| 2018/0349202 A1 | 12/2018 | Sharma et al. | |
| 2019/0149406 A1* | 5/2019 | Fratini | G06F 9/45558 |
| | | | 709/226 |

FOREIGN PATENT DOCUMENTS

| | | |
|---|---|---|
| WO | 2017019018 A1 | 2/2017 |
| WO | 2017076078 A1 | 5/2017 |
| WO | 2017148321 A1 | 9/2017 |
| WO | 2018095518 A1 | 5/2018 |
| WO | 2018149514 A1 | 8/2018 |

\* cited by examiner

HIERARCHICAL CAPACITY MANAGEMENT IN A VIRTUALIZATION ENVIRONMENT

TECHNICAL FIELD

The present disclosure relates generally to virtualization environments, and more particularly to methods, computer-readable media, and apparatuses for hierarchical capacity management in virtualization environments.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
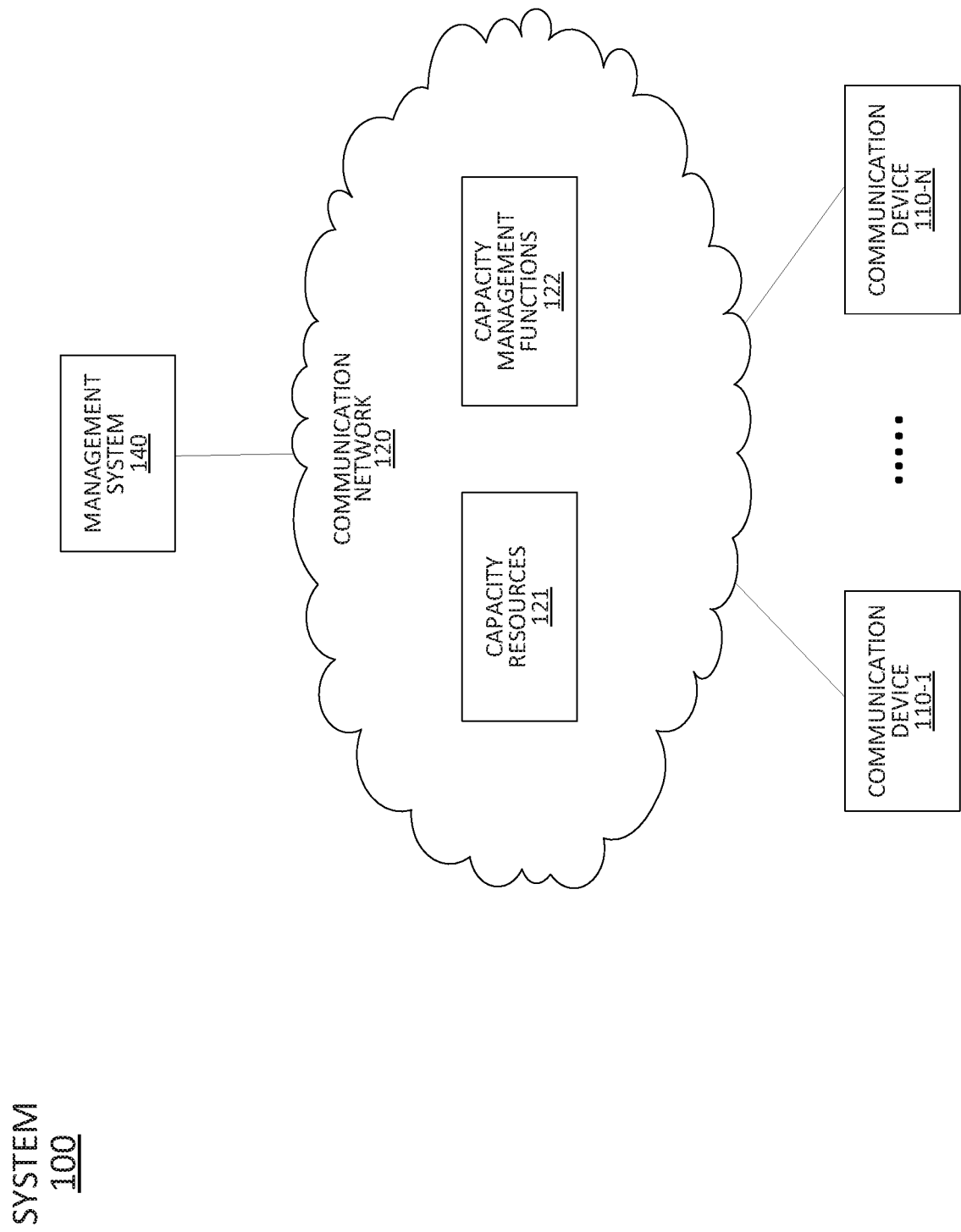
FIG. 1 illustrates an example system for supporting hierarchical capacity management in a virtualization environment, in accordance with the present disclosure.

The present disclosure describes various methods, computer-readable media, and apparatuses for supporting hierarchical capacity management. In one example, hierarchical capacity management within an environment may be supported based on hierarchical capacity management provided by capacity agents at hierarchical layers of the environment.

The hierarchical capacity management may be configured to support various capacity management functions (e.g., capacity monitoring, capacity control, capacity trend analytics, capacity planning, and the like). In one example, the capacity management functions supported based on hierarchical capacity management may include capacity control functions which may include a lifecycle of monitoring, collecting data, analyzing data, optimizing infrastructure, and then returning to monitoring again to continue the lifecycle. In one example, capacity control may be a relatively short-term capacity management function configured to react to the current state of the system for which capacity management is being performed (e.g., using short-term capacity management functions such as load balancing, creating and destroying virtual resources based on current load, and so forth). In one example, the capacity management functions supported based on hierarchical capacity management may include capacity planning functions which may include needs intake and assessment. In one example, capacity planning may be a relatively long-term capacity management function configured to plan for future needs of the system for which capacity management is being performed. It will be appreciated that various other capacity management functions may be used to support capacity control and/or capacity planning. It will be appreciated that hierarchical capacity management may be configured to support various other capacity management functions (e.g., within the context of capacity control and/or capacity planning, in conjunction with capacity control and/or capacity planning, independent of capacity control and/or capacity planning, and so forth).

The hierarchical capacity management may be provided in various environments in which capacity management may be supported. In one example, hierarchical capacity management may be provided in a communication environment configured to support communications based on use of various resources (e.g., physical resources, virtual resources, and the like). In one example, hierarchical capacity management may be provided in a virtualization environment configured to support virtualization of various functions based on various types of virtual resources (e.g., virtualization of various types of communication networks using network function virtualization (NFV) based on virtualized network functions (VNFs), virtualization of applications and workloads using virtualization based on various types of virtual resources, and so forth). It will be appreciated that hierarchical capacity management may be provided in various other environments and contexts within which capacity management may be supported.

In one example, hierarchical capacity management in a virtualization environment may be supported based on hierarchical capacity management provided by capacity agents at hierarchical layers of the virtualization environment. In one example, the present disclosure describes a method, a computer-readable medium, and an apparatus for supporting hierarchical capacity management in a virtualization environment based on a processing system configured to maintain a policy for a first capacity agent at a first hierarchical layer where the policy may include a set of key capacity indicators, a capacity limit, and an algorithm, obtain, based on the set of key capacity indicators, a set of key capacity indicator information, monitor, based on the capacity limit, for a detection of a capacity limit event, determine, based on the algorithm, a predicted capacity exhaustion point, and send, toward a second capacity agent at a second hierarchical layer that is above the first hierarchical layer, the set of key capacity indicator information and the predicted capacity exhaustion point.

In one example, a method for supporting hierarchical capacity management in a virtualization environment is provided. The method includes maintaining, by a processing system including at least one processor, a policy for a first capacity agent at a first hierarchical layer of a virtualization environment, wherein the policy includes a set of key capacity indicators, a capacity limit, and an algorithm. The method includes obtaining, by the processing system based on the set of key capacity indicators, a set of key capacity indicator information. The method includes monitoring, by the processing system based on the capacity limit, for a detection of a capacity limit event. The method includes determining, by the processing system based on the algorithm, a predicted capacity exhaustion point. The method includes sending, by the processing system toward a second capacity agent at a second hierarchical layer of the virtualization environment that is above the first hierarchical layer, the set of key capacity indicator information and the predicted capacity exhaustion point.

In one example, an apparatus configured to support hierarchical capacity management in a virtualization environment is provided. The apparatus includes a processing system including at least one processor. The apparatus includes a computer-readable medium storing instructions which, when executed by the processing system, cause the processing system to perform operations. The operations include maintaining a policy for a first capacity agent at a first hierarchical layer of a virtualization environment, wherein the policy includes a set of key capacity indicators, a capacity limit, and an algorithm. The operations include obtaining, based on the set of key capacity indicators, a set of key capacity indicator information. The operations include monitoring, based on the capacity limit, for a detection of a capacity limit event. The operations include determining, based on the algorithm, a predicted capacity exhaustion point. The operations include sending, toward a second capacity agent at a second hierarchical layer of the virtualization environment that is above the first hierarchical layer, the set of key capacity indicator information and the predicted capacity exhaustion point.

In one example, non-transitory computer-readable medium storing instructions configured to support hierarchical capacity management in a virtualization environment is provided. The non-transitory computer-readable medium stores instructions which, when executed by a processing system including at least one processor, cause the processing system to perform operations. The operations include maintaining a policy for a first capacity agent at a first hierarchical layer of a virtualization environment, wherein the policy includes a set of key capacity indicators, a capacity limit, and an algorithm. The operations include obtaining, based on the set of key capacity indicators, a set of key capacity indicator information. The operations include monitoring, based on the capacity limit, for a detection of a capacity limit event. The operations include determining, based on the algorithm, a predicted capacity exhaustion point. The operations include sending, toward a second capacity agent at a second hierarchical layer of the virtualization environment that is above the first hierarchical layer, the set of key capacity indicator information and the predicted capacity exhaustion point.

It will be appreciated that, although primarily presented herein with respect to supporting hierarchical capacity management in a virtualization environment supporting virtualization of particular types of functions (e.g., network functions to provide a network cloud based on NFV) using particular types of virtual resources (e.g., virtual resources, such as virtual machines (VM), virtual containers (VCs), virtualized network functions (VNFs), and so forth), various examples of the present disclosure may be used to support hierarchical capacity management in a virtualization environment supporting virtualization of various other types of functions, using various other types of virtual resources, and so forth.

It will be appreciated that these and other aspects of the present disclosure are described in greater detail below in connection with the examples of FIGS. 1-4.

FIG. 1 illustrates an example system for supporting hierarchical capacity management in a virtualization environment, in accordance with the present disclosure.

The system 100, as discussed further below, has capacity that may be managed based on capacity management that may be performed or supported based on hierarchical capacity management. In general, capacity management may include capacity management functions of capacity planning and capacity control (although it will be appreciated that various other capacity management functions also may be considered to be part of capacity management). In one example, as indicated above, the capacity management functions supported based on hierarchical capacity management may include capacity planning functions which may include needs intake and assessment. In one example, capacity planning may be a relatively long-term capacity management function configured to plan for the future needs of the system for which capacity management is being performed. In one example, as indicated above, the capacity management functions supported based on hierarchical capacity management may include capacity control functions which may include a lifecycle of monitoring, collecting data, analyzing data, optimizing infrastructure, and then returning to monitoring again to continue the lifecycle. In one example, capacity control may be a relatively short-term capacity management function configured to react to the current state of the system for which capacity management is being performed (e.g., using short-term capacity management functions such as load balancing, creating and destroying virtual resources based on current load, and so forth). It will be appreciated that various other capacity management functions may be used to support capacity control and/or capacity planning. It will be appreciated that hierarchical capacity management may be configured to support various other capacity management functions (e.g., within the context of capacity control and/or capacity planning, in conjunction with capacity control and/or capacity planning, independent of capacity control and/or capacity planning, and the like).

The system 100 includes various elements providing capacity to be managed and various elements configured to support capacity management, including hierarchical capacity management, for the capacity to be managed. As illustrated in FIG. 1, the system 100 includes a set of communication devices 110-1 to 110-N (collectively, communication devices 110), a communication network 120 configured to support communications of the communication devices 110, and a management system 140 configured to perform management functions for managing the communication network 120.

The communication devices 110, as indicated above, are configured to communicate via the communication network 120. The communication devices 110 may include various types of communication devices which may communicate via the communication network 120. For example, the communication devices 110 may include end user devices, such as smartphones, wearable computing devices (e.g., smart glasses or the like), computers, set top boxes, televisions, servers, Internet-of-Things (IoT) devices (e.g., sensors, actuators, and the like), and so forth. For example, the communication devices 110 may include network devices such as application servers, network appliances, and so forth. For example, the communication devices 110 may be configured to support wireline based communications (e.g., cable, optical, and so forth), wireless communications (e.g., WiFi, cellular, satellite, and so forth), or a combination thereof. It will be appreciated that the communication devices 110 may include any types of devices which may communicate via the communication network 120. In one example, a communication device 110 may include a computing system or may be provided using a computing system, such as computing system 400 depicted in FIG. 4, and, thus, may be configured to provide one or more operations or functions for supporting hierarchical capacity management in accordance with the present disclosure.

The communication network 120, as indicated above, is configured to support communications of the communication devices 110. The communication network 120 may be a network cloud configured to support communications of the communication devices 110. The communication network 120 may be configured to support various types of network cloud functions, such as software defined networking (SDN), NFV based on VNFs, and so forth, which may support operation of the communication network 120 as a network cloud. It will be appreciated that operation of the communication network 120 as a network cloud may enable the communication network 120 to operate as a virtualized, or at least partially virtualized, version of various types of communication networks to which virtualization technologies may be applied.

The communication network 120, as indicated above, may be configured to operate as a virtualized, or at least partially virtualized, version of various types of communication networks to which virtualization technologies may be applied. For example, the communication network 120, operating as a network cloud, may be configured to operate as a virtualized local network, a virtualized access network (e.g., a virtualized wireless access network, a virtualized cable access network, or the like), a virtualized core network (e.g., a virtualized wireline core network, a virtualized wireless core network, or the like), a virtualized edge computing network (e.g., a virtualized edge layer, a virtualized fog layer, or the like), a virtualized enterprise network, and so forth. For example, communication network 120, operating as a network cloud, may be configured to operate as a virtualized radio access network (RAN) within a 3G wireless context (e.g., using virtualized Radio Network Controllers (vRNCs), virtualized Generalized Packet Radio Service (GPRS) support nodes (vGSNs) such as virtualized Gateway GPRS support nodes (vGGSNs) and virtualized serving GPRS support nodes (vSGSNs), and the like), a virtualized Evolved Packet Core (vECP) network within a 4G or LTE wireless context (e.g., using virtualized Serving Gateways (vSGWs), virtualized Packet Data Network (PDN) Gateways (vPGWs), virtualized Mobility Management Entities (vMMEs), and the like), as a virtualized RAN within a 5G context, as a virtualized cable access network in a cable network context (e.g., using virtualized head-ends and the like), and so forth. It will be appreciated that the communication network 120 may be a virtualized, or partially virtualized, version of various other types of communication networks which may support communications of communication devices 110 (e.g., telecommunications service provider networks, telephony networks (e.g., an Internet Protocol/Multi-Protocol Label Switching (IP/MPLS) backbone network utilizing Session Initiation Protocol (SIP) for circuit-switched and Voice over Internet Protocol (VoIP) telephony services), broadcast television networks (e.g., a traditional cable provider network or an Internet Protocol Television (IPTV) network, as well as an Internet Service Provider (ISP) network), triple play service network, cellular networks, fixed mobile convergence (FMC) networks (e.g., IP Multimedia Subsystem (IMS) networks), enterprise networks, content delivery networks, and so forth).

The communication network 120 may include various types of capacity resources 121 configured to support operation of the communication network 120 as a network cloud based on use of various types of virtualization technologies. For example, the communication network 120 may include various types of physical resources, such as physical network elements (e.g., 3G base transceiver stations (BTSs), 4G BTSs, 5G remote radio heads (RRHs), switches, routers, servers, storage devices, and so forth), physical resources (e.g., physical computing resources, physical memory resources, physical storage resources, physical input-output resources, hosts, and the like) configured to support various types of virtualized resources (e.g., virtualized processing resources, virtualized memory resources, visualized storage resources, virtualized input-output resources, VMs, VCs, VNFs, and the like), and so forth. It will be appreciated that the capacity resources 121 of communication network 120 may include various other types of physical resources and/or virtual resources which may be utilized in order to provide capacity to support operation of the communication network 120 as a network cloud based on use of various types of virtualization technologies. In one example, one or more capacity resources 121 may include a computing system or may be provided using a computing system, such as computing system 400 depicted in FIG. 4, and, thus, may be configured to provide one or more operations or functions for supporting hierarchical capacity management in accordance with the present disclosure.

The communication network 120 may include a set of capacity management functions 122 configured to support management of the capacity resources 121 of the communication network 120. The capacity management functions 122 may be configured to support various functions associated with management of the capacity resources 121 of the communication network 120, such as active and available inventory (A&AI) functions, inventory and topology management functions, NFV design and creation functions, NFV management and orchestration functions, service design and creation, service management and orchestration, ECOMP (enhanced control, orchestration, management, and policy) functions, DCAE (data collection, analytics, and events) functions, ONAP (open networking automation platform) functions, and so forth. The capacity management functions 122 may be configured to support capacity management for the communication network 120. The capacity management functions 122 may be configured to support capacity management as a service for the communication network 120. The capacity management functions 122 may be configured to operate independently of the management system 140 in providing such functions, may be configured to operate under the control of or in cooperation with the management system 140 in providing such functions, and so forth. In one example, one or more of the capacity management functions 122 may include a computing system or may be provided using a computing system, such as computing system 400 depicted in FIG. 4, and, thus, may be configured to provide one or more operations or functions for supporting hierarchical capacity management in accordance with the present disclosure.

The communication network 120 may be configured such that the capacity resources 121 are organized hierarchically and, similarly, such that the capacity management functions 122 are configured to support hierarchical management of the capacity resources 121. For example, the capacity resources 121 may be distributed across hosts within datacenters, may be distributed across datacenters (e.g., access datacenters, core datacenters, local datacenters, regional datacenters, and so forth), may be distributed across regions of a network, and so forth. For example, the capacity management functions 122 may include local capacity management functions operating locally within datacenters (e.g., operating on individual hosts within datacenters, operating for groups of hosts within datacenters, and the like), datacenter capacity management functions operating at the datacenter layer on a per-datacenter basis (e.g., operating within datacenters to providing capacity management functions for the datacenters, respectively), regional capacity management functions operating at the regional layer for groups of datacenters (e.g., where the grouping of datacenters for regional management may be based on geography, location within the overall network, and so forth), network capacity management functions operating at the network layer (e.g., providing overall management functions for the network and, thus, for the set of regions of which the network is composed), and so forth. It will be appreciated that some capacity management functions 122 may be the same at different layers of the hierarchy, some capacity management functions 122 may vary across different layers of the hierarchy, and so forth. It will be appreciated that fewer or more, as well as different, hierarchical layers may be defined for the capacity resources 121 and/or for the capacity management functions 122. The hierarchical organization of capacity resources 121 and associated hierarchical management of the capacity resources 121 by the capacity management functions 122 may be further understood by way of reference to FIG. 2.

The communication network 120, as indicated above, may be configured to support hierarchical capacity management for the capacity resources 121 based on use of the capacity management functions 122.

The capacity management functions 122, as indicated above, may be configured to support capacity management for the capacity resources 121 of the communication network 120 based on a hierarchy of capacity agents deployed within the communication network. The capacity agents may include local capacity agents running on hosts within the communication network, datacenter capacity agents operating within datacenters on groups of hosts, regional capacity agents operating on groups of datacenters, national capacity agents operating on groups of regional capacity agents, and so forth.

The capacity agents may be configured to perform various capacity management functions for supporting capacity management within the communication network. For example, the capacity agents may be configured to perform capacity management functions such as collection of capacity information, processing of capacity information, reporting of capacity information to higher layers, monitoring of capacity information for detection of capacity events (e.g., capacity limit reached or other events), reporting of detected capacity events, prediction of capacity exhaustion points (e.g., a length of time until capacity is predicted to be exhausted, a future time at which capacity is predicted to be exhausted, and so forth), reporting of predicted capacity exhaustion points to higher layers, performing management actions (e.g., based on collected or reported capacity information, determined or reported predicted capacity exhaustion points, and so forth), requesting initiation of management actions (e.g., at local layers, by higher layers, and so forth), and so forth. It will be appreciated that the capacity agents may be configured to perform various other capacity management functions.

The capacity agents may be configured to perform various capacity management functions, for supporting capacity management within the communication network, based on various types of capacity information. For example, capacity information which may be used by capacity agents to support capacity management functions may include key capacity indicators (KCIs), such as central processing unit (CPU) utilization, memory utilization, storage utilization, traffic throughput, and so forth. For example, capacity information which may be used by capacity agents to support capacity management functions may include other types of capacity information which may be indicative of capacity within the communication network, load within the communication network, and so forth. It will be appreciated that other types of capacity information may be used by the capacity agents to support capacity management functions. It will be appreciated that capacity management also may be performed based on other types of information (e.g., information which may be indicative of capacity, information related to capacity, and so forth), such as load information (e.g., higher load may be indicative of higher used capacity and lower load may be indicative of lower used capacity, higher load may result in lower available capacity and lower load may result in higher available capacity, and so forth) or other suitable types of information.

The capacity agents may be configured to operate to provide such capacity management functions based on profiles configured on or otherwise available to the capacity agents. The profiles configured on or otherwise available to the capacity agents may include information configured for use by the capacity agents in performing capacity management functions (e.g., indications of KCIs to be considered in providing capacity management, indication of capacity limits related to capacity management, algorithms for predicting capacity exhaustion points, and so forth). The profiles may be configured on or otherwise made available to the capacity agents by the management system 140 or other suitable sources of such profiles.

Figure 2:
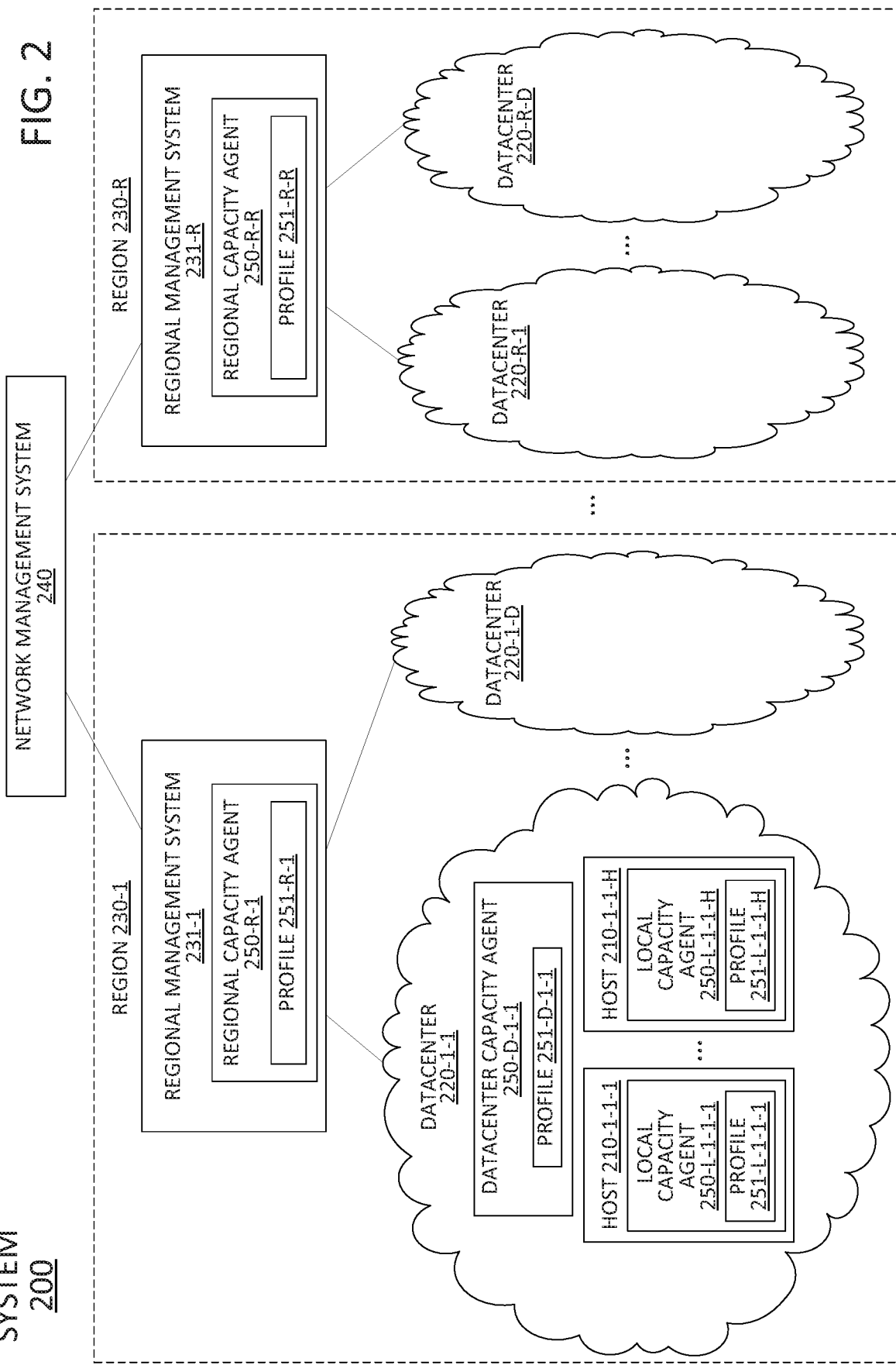
FIG. 2 illustrates an example system for supporting hierarchical capacity management in a virtualization environment, in accordance with the present disclosure.

As indicated above, the hierarchical organization of capacity resources 121 and associated hierarchical capacity management of the capacity resources 121 by the capacity management functions 122, including use of a hierarchy of capacity agents to perform capacity management within the communication network 120, may be further understood by way of reference to FIG. 2.

The management system 140 may be configured to provide various management functions for supporting management of the communication network 120. The management system 140 may be configured to support various functions associated with management of the communication network 120, such as active and available inventory (A&AI) functions, inventory and topology management functions, NFV design and creation functions, NFV management and orchestration functions, service design and creation, service management and orchestration, ECOMP (enhanced control, orchestration, management, and policy) functions, DCAE (data collection, analytics, and events) functions, ONAP (open networking automation platform) functions, and so forth). The management system 140 may be configured to support capacity management for the communication network 120. The management system 140 may be configured to support capacity management as a service for the communication network 120. The management system 140 may be configured to operate independently of capacity management functions 122 in providing such functions, may be configured to control or operate in cooperation with the capacity management functions 122 in providing such functions, and so forth. In one example, the management system 140 includes a computing system, such as computing system 400 depicted in FIG. 4, and, thus, may be configured to provide one or more operations or functions for supporting hierarchical capacity management in accordance with the present disclosure.

It should be noted that the system 100 has been simplified. Thus, it should be noted that the system 100 may be implemented in a different form than that which is illustrated in FIG. 1. For example, system 100 may be expanded by including additional communication devices, networks, capacity resources, capacity management functions, management systems, and so forth, without altering the scope of the present disclosure. For example, the system 100 may be altered to omit various elements, substitute elements for other elements that perform the same or similar functions, combine elements that are illustrated as separate elements, and/or implement elements as functions that are spread across several devices that operate collectively as the respective elements, without altering the scope of the present disclosure. It will be appreciated that the system 100 may be modified in various other ways while still supporting hierarchical capacity management in a virtualization environment supporting a network cloud. Therefore, these and various other modifications are all contemplated within the scope of the present disclosure.

It is noted that various features discussed in conjunction with FIG. 1 may be further understood from the example system of FIG. 2.

FIG. 2 illustrates an example system for supporting hierarchical capacity management in a virtualization environment, in accordance with the present disclosure.

The system 200 includes hosts 210, which are hosted within datacenters 220, which are organized into regions 230 which are managed by regional management systems 231, where the regions 230 are managed by a network management system 240 configured to provide overall network management for the various hosts 210 of the various datacenters 220 of the various regions 230. More specifically, as illustrated in FIG. 2, the network management system 240 is associated with a set of regions 230-1-230-R (collectively, as indicated above, regions 230) including respective regional management systems 231-1-231-R (collectively, as indicated above, regional management systems 231), each of the regions 230 includes a respective set of datacenters 220 (illustratively, region 230-1 includes a set of datacenters 220-1-1 to 220-1-D, region 230-R includes a set of datacenters 220-R-1-220-R-D, and so forth, with other regions being omitted for purposes of clarity), and each of the datacenters 220 includes a set of hosts 210 (illustratively, datacenter 220-1-1 includes a set of hosts 210-1-1-1 to 210-1-1-H, with details of datacenters 220-1-D, 220-R-1, and 220-R-D being omitted for purpose of clarity and with other datacenters 220 also being omitted for purposes of clarity).

The hosts 210 may be configured to provide various functions within the datacenters 220 within which the hosts 210 are hosted. The hosts 210 may be configured to support various virtual resources, such as virtual processing resources, virtual memory resources, virtual storage resources, virtual input-output resources, VMs, VCs, VNFs, and so forth. The hosts 210 may be configured to support virtualization of various types of functions for various types of networks, such as those discussed with respect to the communication network 120 (and associated capacity resources 121) of FIG. 1. The hosts 210 may be configured to support various management functions. The management functions supported by the hosts 210 may include various management functions described with respect to FIG. 1 as being supported by the capacity management functions 122.

The datacenters 220 may include one or more management systems (omitted for clarity), respectively, which may be configured to provide management functions for the datacenters 220 and, thus, for the various hosts 210 of the datacenters 220, respectively. The management functions supported by such management systems for the datacenters 220 may include various management functions described with respect to FIG. 1 as being supported by the capacity management functions 122 and the management system 140.

The regional management systems 231 are configured to provide management functions for the regions 230, respectively, and, thus, for the various hosts 210 of the various datacenters 220 of the various regions 230, respectively. The management functions supported by the regional management systems 231 for the regions 230 may include various management functions described with respect to FIG. 1 as being supported by the capacity management functions 122 and the management system 140.

The network management system 240 is configured to provide management functions for the regions 230 and, thus, for the various hosts 210 of the various datacenters 220 of the various regions 230. The management functions supported by the network management system 240 for the regions 230 may include various management functions described with respect to FIG. 1 as being supported by the capacity management functions 122 and the management system 140.

The system 200 may be considered to have capacity to provide various functions, where it will be appreciated that such capacity may be provided by the hosts 210 at the host layer. More specifically, the hosts 210 may be considered to have capacity to provide various functions within the datacenters 220 within which the hosts 210 are hosted. As discussed herein, the capacity of the hosts 210 may be in the form of CPU capacity (e.g., measured based on CPU utilization), memory capacity (e.g., measured based on memory utilization), storage capacity (e.g., measured based on storage utilization), input-output capacity (e.g., measured based on input-output utilization), throughput capacity (e.g., measured based on throughput utilization), and so forth. As discussed herein, the capacity of the hosts 210 may be managed at various hierarchical layers of the system 200 (e.g., locally at the host layer of the hosts 210, in an aggregated manner at the datacenter layer of the datacenters 220, in an aggregated manner at the regional layer of the regions 230, in an aggregated manner at one or more layers above the regional layer of the regions 230, and so forth).

The system 200 includes a hierarchy of capacity agents 250 configured to support hierarchical capacity management based on a set of profiles 251.

The hierarchy of capacity agents 250 includes a set of local capacity agents 250-L at the host layer (e.g., each host 210-x includes an associated local capacity agent 250-L-x which, as illustrated in FIG. 2, includes a local capacity agent 250-L-1-1-1 on host 210-1-1-1 to provide capacity management for host 210-1-1-1, a local capacity agent 250-L-1-1-H on host 210-1-1-H to provide capacity management for host 210-1-1-H, and so forth), a set of datacenter capacity agents at the datacenter layer (e.g., each datacenter 220-x includes an associated datacenter capacity agent 250-D-x which, as illustrated in FIG. 2, includes a datacenter capacity agent 250-D-1-1 providing capacity management for datacenter 220-1-1, and so forth), and a set of regional capacity agents at the region layer (e.g., each regional management system 231 of each region 230 includes a regional capacity agent 250-R which, as illustrated in FIG. 2, includes a regional capacity agent 250-R-1 providing capacity management for the datacenters 220-1 in region 230-1, a regional capacity agent 250-R-R providing capacity management for the datacenters 220-R in region 230-R, and so forth.

The hierarchy of capacity agents 250 is configured to support hierarchical capacity management based on profiles 251 maintained by the capacity agents 250. The local capacity agents 250-L include respective profiles 251-L for use by the local capacity agents 250-L in providing capacity management functions for the respective hosts 210 (illustratively, local capacity agent 250-L-1-1-1 includes a profile 251-L-1-1-1, local capacity agent 250-L-1-1-H includes a profile 251-L-1-1-H, and so forth). The datacenter capacity agents 250-D include respective profiles 251-D for use by the datacenter capacity agents 250-D in providing capacity management functions for the respective datacenters 220 (illustratively, datacenter capacity agent 250-D-1-1 includes a profile 251-D-1-1 and so forth). The regional capacity agents 250-R include respective profiles 251-R for use by the regional capacity agents 250-R in providing capacity management functions for the respective regions 230 (illustratively, regional capacity agent 250-R-1 includes a profile 251-R-1, regional capacity agent 250-R-R includes a profile 251-R-R, and so forth). It will be appreciated that the profiles 251 maintained at the various hierarchical layers may be similar in some respects (e.g., where similar functions are performed by the capacity agents 250 at the various hierarchical layers) and may be different in some respects (e.g., since some capacity management functions supported by the capacity agents 250 may be different across different layers of the hierarchy). The profiles 251 may be provided to the capacity agents 250 by the network management system 240 (e.g., directly from the network management system 240 to the respective capacity agents 250, based on distribution through the hierarchy of capacity agents 250 from the network management system 240 toward the local capacity agents 250-L, and so forth) or from any other suitable source of the profiles 251 for the capacity agents.

The capacity agents 250 may be configured to perform various functions for supporting hierarchical capacity management in a virtualization environment. For example, capacity agents 250 may be configured to perform functions such as collection of capacity information (e.g., KCIs), processing of capacity information, reporting of capacity information to higher layers, monitoring of capacity information for detection of capacity events, reporting of detected capacity events, prediction of capacity exhaustion points, reporting of predicted capacity exhaustion points to higher layers, performing management actions, requesting initiation of management actions by higher layers, and so forth. It will be appreciated that the various functions supported by capacity agents 250 may differ at different hierarchical layers of the hierarchy of capacity agents 250 (e.g., capacity agents 250 lower in the hierarchy may be focused more on collection of capacity information, processing of capacity information, reporting of capacity information to higher layers, monitoring of capacity information for detection of capacity events, reporting of detected capacity events, prediction of capacity exhaustion points, reporting of predicted capacity exhaustion points to higher layers, and so forth, whereas capacity agents 250 higher in the hierarchy may be focused more on reception and analysis of capacity information, reception and handling of notifications of detected capacity events, reception and analysis of predicted capacity exhaustion points, initiation of various management actions and so forth). The various functions supported by capacity agents 250 at various layers of the hierarchy of capacity agents 250 are discussed further below.

The local capacity agents 250-L operating on the hosts 210 are configured to provide capacity management functions (e.g., capacity monitoring for capacity control, capacity prediction for capacity planning, and so forth) based on the profiles 251-L available to the local capacity agents 250-L, respectively. The local capacity agents 250-L operating on the hosts 210 may be configured to provide capacity management functions for the hosts 210, capacity management functions for supporting capacity management functions to be performed at higher layers of the hierarchy of capacity agents 250, and so forth.

The profile 251-L available to a local capacity agent 250-L may include profile information configured to support capacity management functions to be supported by the local capacity agent 250-L. The profile 251-L available to a local capacity agent 250-L may include an indication of a set of KCIs to be considered by the local capacity agent 250-L, a capacity limit of the host 210 with which the local capacity agent 250-L is associated, and an ML-based load prediction algorithm and parameters (which may be specified as part of the ML-based load prediction algorithm). The local capacity agent 250-L may be configured to perform various capacity management functions, including relatively short-term capacity control functions and relatively long-term capacity planning functions, based on the profile 251-L available to the local capacity agent 250-L.

The local capacity agent 250-L associated with a host 210 may be configured to collect KCI information for the KCIs specified in the profile 251-L available to the local capacity agent 250-L to form collected KCI information. The collection of the KCI information for the KCIs specified in the profile 251-L available to the local capacity agent 250-L may be performed in various ways. For example, the collection of the KCI information for the KCIs specified in the profile 251-L available to the local capacity agent 250-L may be performed by collecting the KCI information from feeds, based on monitoring of traffic (e.g., control traffic, data traffic, and so forth) at the host 210, and so forth. In one example, collection of KCI information at the host 210 may be performed using Fluent Bit, Telegraf, or other metric collection processes.

It will be appreciated that KCI information may be collected for all of the KCIs specified in the profile 251-L available to the local capacity agent 250-L or for a subset of KCIs specified in the profile 251-L available to the local capacity agent 250-L.

It will be appreciated that the KCI information for the host 210 may be collected periodically (e.g., once each minute, once every 15 minutes, once each hour, once each day, and so forth), responsive to detection of a condition (e.g., receipt of a new profile 251-L for the local capacity agent 250-L, detection of a capacity event at the host 210, detection of a request for new KCI information to be collected and sent, and the like), and so forth.

It will be appreciated that the collected KCI information may be used at various layers of the hierarchy of capacity agents 250 for various purposes, such as at the local capacity agent 250-L for generating processed KCI information which may be delivered to higher layers of the hierarchy of capacity agents 250, at the local capacity agent 250-L for monitoring the capacity of the host 210 (and, e.g., raising a local capacity limit alarm when a capacity limit is reached), at the local capacity agent 250-L for predicting a potential capacity exhaustion point of the host 210, at higher layers of the hierarchy of capacity agents 250 for supporting various capacity management functions (e.g., capacity monitoring, capacity control, capacity trend analytics, capacity planning, and the like), and so forth. It will be appreciated that the collected KCI information may be used for relatively short-term capacity management functions (e.g., load balancing, creating and destroying virtual resources based on current load, and so forth) and for relatively long-term capacity management functions (e.g., long-term capacity planning and so forth).

The local capacity agent 250-L associated with a host 210 may be configured to process the collected KCI information to form processed KCI information and send the processed KCI information to the datacenter capacity agent 250-D with which the local capacity agent 250-L is associated.

The processing of the collected KCI information to form the processed KCI information may include various types of processing. For example, the processing of the collected KCI information to form the processed KCI information may include parsing the collected KCI information, aggregating the collected KCI information, formatting the collected KCI information, eliminating redundant KCI information from the collected KCI information, generating summaries of the collected KCI information, and so forth.

The sending of the processed KCI information to the datacenter capacity agent 250-D may be performed in various ways. For example, the sending of the processed KCI information to the datacenter capacity agent 250-D with which the local capacity agent 250-L is associated may be performed using various protocols, message formats, data formats, and so forth.

It will be appreciated that the processed KCI information for the host 210 may be determined and sent to the datacenter capacity agent 250-D with which the local capacity agent 250-L is associated periodically (e.g., once each minute, once every 15 minutes, once each hour, once each day, and so forth), responsive to detection of a condition (e.g., receipt of a new profile 251-L for the local capacity agent 250-L, detection of a capacity event at the host 210, detection of a request for the processed KCI information for the host 210 to be determined and sent, and the like), and so forth.

It will be appreciated that the processed KCI information may be used at various layers of the hierarchy of capacity agents 250 for various purposes, such as at the local capacity agent 250-L for monitoring the capacity of the host 210 (and, e.g., raising a local capacity limit alarm when a capacity limit is reached), at the local capacity agent 250-L for predicting a potential capacity exhaustion point of the host 210, at higher layers of the hierarchy of capacity agents 250 for supporting various capacity management functions (e.g., capacity monitoring, capacity control, capacity trend analytics, capacity planning, and the like), and so forth. It will be appreciated that the processed KCI information may be used for relatively short-term capacity management functions (e.g., load balancing, creating and destroying virtual resources based on current load, and so forth) and for relatively long-term capacity management functions (e.g., long-term capacity planning and so forth).

The local capacity agent 250-L associated with a host 210 may be configured to monitor a measured capacity of the host 210 based on the KCIs specified in the profile 251-L available to the local capacity agent 250-L and evaluate the measured capacity of the host 210 based on the capacity limit specified in profile 251-L available to the local capacity agent 250-L for determining whether to send a notification to the datacenter capacity agent 250-D with which the local capacity agent 250-L is associated.

The local capacity agent 250-L may monitor the measured capacity of the host 210 based on the KCIs specified in the profile 251-L by processing the collected KCI information for the KCIs specified in the profile 251-L available to the local capacity agent 250-L, the processed KCI information generated based on processing of the collected KCI information for the KCIs specified in the profile 251-L available to the local capacity agent 250-L, and so forth. It will be appreciated that the measured capacity and the capacity limit used for evaluation of the measured capacity may be based on one or more KCIs (e.g., a single KCI, a combination of KCIs, a weighted combination of KCIs, or the like) specified in the profile 251-L available to the local capacity agent 250-L. For example, the measured capacity and the capacity limit used for evaluation of the measured capacity may be based on CPU utilization, memory utilization, traffic throughput, a combination of CPU utilization and traffic throughput, a combination of memory utilization and traffic throughput, and so forth.

The local capacity agent 250-L may send a notification to the datacenter capacity agent 250-D based on a determination that the measured capacity of the host 210 has reached the capacity limit (e.g., equals or exceeds the capacity limit). The notification may include a notification message, an alarm, or other suitable message or indicator configured to indicate to the datacenter capacity agent 250-D that the measured capacity of the host 210 has reached the capacity limit specified for the host 210. It will be appreciated that the datacenter capacity agent 250-D, upon receiving a notification from the local capacity agent 250-L that is indicative that the capacity limit for the host 210 has been reached, may initiate one or more management actions (e.g., initiating a load-balancing operation within the datacenter 220, initiating an auto-scaling operation within the datacenter 220, sending the notification or other indication of the capacity limit being reached for the host 210 to one or more other entities (e.g., the regional capacity agent 250-R with which the datacenter capacity agent 250-D is associated, one or more management systems, or the like) for use by the one or more entities in initiating one or more management actions, and so forth).

It will be appreciated that the monitoring of the capacity of the host 210 may be performed periodically (e.g., once each minute, once every 15 minutes, once each hour, and so forth), responsive to detection of a condition (e.g., receipt of a new profile 251-L for the local capacity agent 250-L, detection of a capacity event at the host 210, detection of a request for monitoring of the capacity of the host 210, and the like), and so forth.

It will be appreciated that the determination by the local capacity agent 250-L that the capacity limit for the host 210 has been reached may be used at the local capacity agent 250-L for various purposes (e.g., for triggering load balancing, triggering auto-scaling, and the like) and, similarly, that the notification from the local capacity agent 250-L that is indicative that the capacity limit for the host 210 has been reached may be used at various higher layers of the hierarchy of capacity agents 250 for various purposes (e.g., for triggering load balancing, triggering auto-scaling, capacity trend analytics, capacity planning, and the like). It will be appreciated that the determination by the local capacity agent 250-L that the capacity limit for the host 210 has been reached may be used for relatively short-term capacity management functions (e.g., load balancing, creating and destroying virtual resources based on current load, and so forth) and for relatively long-term capacity management functions (e.g., long-term capacity planning and so forth).

The local capacity agent 250-L associated with a host 210 may be configured to determine a predicted capacity exhaustion point for the host 210 and send the predicted capacity exhaustion point for the host 210 to the datacenter capacity agent 250-D with which the local capacity agent 250-L is associated.

The local capacity agent 250-L may determine the predicted capacity exhaustion point for the host 210 based on the ML-based load prediction algorithm and parameters specified in the profile 251-L available to the local capacity agent 250-L. The local capacity agent 250-L may determine the predicted capacity exhaustion point for the host 210 based on the ML-based load prediction algorithm and parameters by processing KCI information associated with the host 210 (e.g., collected KCI information, processed KCI information, and so forth) using the ML-based load prediction algorithm and parameters.

It will be appreciated that the ML-based load prediction algorithm may include any suitable ML-based load prediction algorithm that is configured to support determination of the predicted capacity exhaustion point for the host 210 (e.g., based on ML techniques such as regression, random forest, and so forth) and that the associated ML-based load prediction parameters used by the ML-based load prediction algorithm may include any suitable ML-based load prediction parameters that are configured to support determination of the predicted capacity exhaustion point for the host 210 (e.g., based on parameters such as current load, future load, load threshold, and so forth).

It will be appreciated that use of the ML-based load prediction algorithm and parameters by the local capacity agent 250-L of the host 210 to determine the predicted capacity exhaustion point for the host 210 may be further understood from the following examples.

In one example, parameters for the ML-based load prediction algorithm may include a current load parameter, a predicted future load parameter, and a load threshold parameter. It will be appreciated that the value of the load threshold parameter may be specified as part of the parameters for the ML-based load prediction algorithm and that the values of the current load parameter and the predicted future load parameter may be determined by the ML-based load prediction algorithm. The parameters for the ML-based load prediction algorithm also may include an indication of which KCI parameters are to be used by the ML-based load prediction algorithm as the basis for determining the current load parameter and the predicted future load parameter. The ML-based load prediction algorithm may determine the current load of the host 210 based on the processing of the KCI information for the host 210 (e.g., collected KCI information, processed KCI information, and so forth). The ML-based load prediction algorithm may determine the predicted future load of the host 210 based on processing of the current load for the host 210 and the KCI information for the host 210. The predicted capacity exhaustion point for the host 210 may be determined by the ML-based load prediction algorithm based on the current load for the host 210, the predicted future load for the host 210, and the load threshold parameter for the host 210. The predicted capacity exhaustion point for the host 210 may be determined by the ML-based load prediction algorithm by analyzing the current load for the host 210 and a timing associated with the predicted future load for the host 210 to determine a time in the future at which the load threshold parameter for the host 210 is predicted to be reached. This time in the future at which the load threshold parameter for the host 210 is predicted to be reached may be used as the predicted capacity exhaustion point for the host 210. It will be appreciated that this example may be further understood from the following example.

For example, where the parameters for the ML-based load prediction algorithm include a current load parameter, a predicted future load parameter, and a load threshold parameter, the predicted capacity exhaustion point for the host 210 may be determined as follows. In this example, assume that the load on the host 210 is based on CPU utilization of the host 210 (it will be appreciated that the load on the host 210 may be based on various other types of KCIs or combinations of KCIs). In this example, further assume that the value for the load threshold parameter is 80%. In this example, assume that the ML-based load prediction algorithm determines, based on the processing of the KCI information for the host 210, that the current load on the host 210 is 45%. In this example, assume that the ML-based load prediction algorithm determines, based on the processing of the KCI information for the host 210, that the predicted future load on the host 210 in one month will be 50%. The ML-based load prediction algorithm may then use the current load of 45%, the one-month predicted load of 50%, and the load threshold parameter of 80% to determine that the predicted capacity exhaustion point for the host 210 is approximately 7 months.

It will be appreciated that, although the foregoing examples primarily are based on use of specific types and numbers of parameters in specific ways to determine the predicted capacity exhaustion point for the host 210, the predicted capacity exhaustion point for the host 210 may be determined by the ML-based load prediction algorithm based on other types of parameters, other numbers of parameters, use of parameters in other ways, and so forth.

The sending of the predicted capacity exhaustion point for the host 210 to the datacenter capacity agent 250-D with which the local capacity agent 250-L is associated may be performed in various ways. For example, the sending of the predicted capacity exhaustion point for the host 210 to the datacenter capacity agent 250-D with which the local capacity agent 250-L is associated may be performed using various protocols, message formats, data formats, and so forth.

It will be appreciated that the predicted capacity exhaustion point for the host 210 may be determined and sent to the datacenter capacity agent 250-D with which the local capacity agent 250-L is associated periodically (e.g., once each hour, once each day, once each month, and so forth), responsive to detection of a condition (e.g., receipt of a new profile 251-L for the local capacity agent 250-L, detection of a capacity event at the host 210, detection of a request for the predicted capacity exhaustion point for the host 210 to be determined and sent, and the like), and so forth.

It will be appreciated that the predicted capacity exhaustion point for the host 210 may be used at various layers of the hierarchy of capacity agents 250 for various purposes, such as at the local capacity agent 250-L for triggering a notification based on a determination that the predicted capacity exhaustion point for the host 210 has been reached at the host 210, at higher layers of the hierarchy of capacity agents 250 for supporting various capacity management functions (e.g., capacity monitoring, capacity control, capacity trend analytics, capacity planning, and the like), and so forth. It will be appreciated that the predicted capacity exhaustion point for the host 210 may be used for relatively short-term capacity management functions (e.g., load balancing, creating and destroying virtual resources based on current load, and so forth) and for relatively long-term capacity management functions (e.g., long-term capacity planning and so forth).

It will be appreciated that the profiles 251-L available to the local capacity agents 250-L may include less or more (as well as different) information, the local capacity agents 250-L may be configured to perform fewer or more (as well as different) functions based on the profiles 251-L available to the local capacity agents 250-L, and so forth.

The datacenter capacity agents 250-D operating within the datacenters 220 are configured to provide capacity management functions (e.g., capacity monitoring for capacity control, capacity prediction for capacity planning, and so forth) based on the profiles 251-D available to the datacenter capacity agents 250-D, respectively. The datacenter capacity agents 250-D may be configured to provide capacity management functions for the hosts 210 within the datacenter 220, capacity management functions for supporting capacity management functions to be performed at higher layers of the hierarchy of capacity agents 250, and so forth.

The profile 251-D available to a datacenter capacity agent 250-D may include profile information configured to support capacity management functions to be supported by the datacenter capacity agent 250-D. The profile 251-D available to a datacenter capacity agent 250-L may include an indication of a set of KCIs to be considered by the datacenter capacity agent 250-D, a capacity limit of the datacenter 220 with which the datacenter capacity agent 250-D is associated (e.g., a cumulative capacity limit of the hosts 210 in the datacenter 220 that are under capacity management), and an ML-based load prediction algorithm and parameters (which may be specified as part of the ML-based load prediction algorithm). The datacenter capacity agent 250-D may be configured to perform various capacity management functions, including relatively short-term capacity control functions and relatively long-term capacity planning functions, based on the profile 251-D available to the datacenter capacity agent 250-D.

The datacenter capacity agent 250-D associated with a datacenter 220 may be configured to collect KCI information for the KCIs specified in the profile 251-D available to the datacenter capacity agent 250-D to form collected KCI information. The collection of the KCI information for the KCIs specified in the profile 251-D available to the datacenter capacity agent 250-D may be performed in various ways. For example, the collection of the KCI information for the KCIs specified in the profile 251-D available to the datacenter capacity agent 250-D may be performed by collecting the KCI information being reported by local capacity agents 250-L associated with hosts 210 located within the datacenter 220, based on monitoring of traffic (e.g., control traffic, data traffic, and so forth) of hosts 210 within the datacenter 220, and so forth.

It will be appreciated that KCI information may be collected for all of the KCIs specified in the profile 251-D available to the datacenter capacity agent 250-D or for a subset of KCIs specified in the profile 251-D available to the datacenter capacity agent 250-D.

It will be appreciated that the KCI information for the datacenter 220 may be collected periodically (e.g., once each minute, once every 15 minutes, once each hour, once each day, and so forth), responsive to detection of a condition (e.g., receipt of KCI feeds from local capacity agents 250-L associated with hosts 210 of the datacenter 220, receipt of a new profile 251-D for the datacenter capacity agent 250-D, detection of a capacity event at the datacenter 220, detection of a request for new KCI information to be collected and sent, and the like), and so forth.

It will be appreciated that the collected KCI information may be used at various layers of the hierarchy of capacity agents 250 for various purposes, such as at the datacenter capacity agent 250-D for generating processed KCI information which may be delivered to higher layers of the hierarchy of capacity agents 250, at the datacenter capacity agent 250-D for monitoring the capacity of the datacenter 220 (and, e.g., raising a local capacity limit alarm or performance impact alarm when a capacity limit is reached), at the datacenter capacity agent 250-D for predicting a potential capacity exhaustion point of the datacenter 220, at higher layers of the hierarchy of capacity agents 250 for supporting various capacity management functions (e.g., capacity monitoring, capacity control, capacity trend analytics, capacity planning, and the like), and so forth. It will be appreciated that the collected KCI information may be used for relatively short-term capacity management functions (e.g., load balancing, creating and destroying virtual resources based on current load, and so forth) and for relatively long-term capacity management functions (e.g., long-term capacity planning and so forth).

The datacenter capacity agent 250-D associated with a datacenter 220 may be configured to process the collected KCI information (e.g., collected from the hosts 210 within the datacenter 220) to form processed KCI information and send the processed KCI information to the regional capacity agent 250-R with which the datacenter capacity agent 250-D is associated.

The processing of the collected KCI information to form the processed KCI information may include various types of processing. For example, the processing of the collected KCI information to form the processed KCI information may include parsing the collected KCI information, aggregating the collected KCI information, formatting the collected KCI information, eliminating redundant KCI information from the collected KCI information, generating summaries of the collected KCI information, and so forth.

The sending of the processed KCI information to the regional capacity agent 250-R may be performed in various ways. For example, the sending of the processed KCI information to the regional capacity agent 250-R with which the datacenter capacity agent 250-D is associated may be performed using various protocols, message formats, data formats, and so forth.

It will be appreciated that the processed KCI information for the datacenter 220 may be determined and sent to the regional capacity agent 250-R with which the datacenter capacity agent 250-D is associated periodically (e.g., once each minute, once every 15 minutes, once each hour, once each day, and so forth), responsive to detection of a condition (e.g., receipt of KCI feeds from local capacity agents 250-L associated with hosts 210 of the datacenter 220, receipt of a new profile 251-D for the datacenter capacity agent 250-D, detection of a capacity event at the datacenter 220, detection of a request for the processed KCI information for the datacenter 220 to be determined and sent, and the like), and so forth.

It will be appreciated that the processed KCI information may be used at various layers of the hierarchy of capacity agents 250 for various purposes, such as at the datacenter capacity agents 250-D for monitoring the capacity of the datacenter 220, at the datacenter capacity agents 250-D for predicting a potential capacity exhaustion point of the datacenter 220, at higher layers of the hierarchy of capacity agents 250 for supporting various capacity management functions (e.g., capacity monitoring, capacity control, capacity trend analytics, capacity planning, and the like), and so forth. It will be appreciated that the processed KCI information may be used for relatively short-term capacity management functions (e.g., load balancing, creating and destroying virtual resources based on current load, and so forth) and for relatively long-term capacity management functions (e.g., long-term capacity planning and so forth).

The datacenter capacity agent 250-D associated with a datacenter 220 may be configured to monitor a measured capacity of the datacenter 220 based on the KCIs specified in the profile 251-D available to the datacenter capacity agent 250-D and evaluate the measured capacity of the datacenter 220 based on the capacity limit specified in profile 251-D available to the datacenter capacity agent 250-D for determining whether to send a notification to the regional capacity agent 250-R with which the datacenter capacity agent 250-D is associated.

The datacenter capacity agent 250-D may monitor the measured capacity of the datacenter 220 based on the KCIs specified in the profile 251-D by processing the collected KCI information for the KCIs specified in the profile 251-D available to the datacenter capacity agent 250-D, the processed KCI information generated based on processing of the collected KCI information for the KCIs specified in the profile 251-D available to the datacenter capacity agent 250-D, and so forth. It will be appreciated that the measured capacity and the capacity limit used for evaluation of the measured capacity are evaluated at the datacenter layer and, thus, are based on the aggregation of capacity information (e.g., KCI feeds) received from the hosts 210 of the datacenter 220. It will be appreciated that the measured capacity and the capacity limit used for evaluation of the measured capacity may be based on one or more KCIs (e.g., a single KCI, a combination of KCIs, a weighted combination of KCIs, or the like) specified in the profile 251-D available to the datacenter capacity agent 250-D. For example, the measured capacity and the capacity limit used for evaluation of the measured capacity may be based on CPU utilization, memory utilization, traffic throughput, a combination of CPU utilization and traffic throughput, a combination of memory utilization and traffic throughput, and so forth.

The datacenter capacity agent 250-D may send a notification to the regional capacity agent 250-R based on a determination that the measured capacity of the datacenter 220 has reached the capacity limit (e.g., equals or exceeds the capacity limit). The notification may include a notification message, an alarm, or other suitable message or indicator configured to indicate to the regional capacity agent 250-R that the measured capacity of the datacenter 220 has reached the capacity limit specified for the datacenter 220. It will be appreciated that the regional capacity agent 250-R, upon receiving a notification from the datacenter capacity agent 250-D that is indicative that the capacity limit for the datacenter 220 has been reached, may initiate one or more management actions (e.g., initiating a load-balancing operation within the datacenter 220 or across datacenters 220 associated with the region, initiating an auto-scaling operation within the datacenter 220 or across datacenters 220 associated with the region, sending the notification or other indication of the capacity limit being reached for the datacenter 220 to one or more other entities (e.g., one or more management systems or the like) for use by the one or more entities in initiating one or more management actions, and so forth).

It will be appreciated that the monitoring of the capacity of the datacenter 220 may be performed periodically (e.g., once each minute, once every 15 minutes, once each hour, and so forth), responsive to detection of a condition (e.g., receipt of KCI feeds from local capacity agents 250-L associated with the hosts 210 of the datacenter 220, receipt of a new profile 251-D for the datacenter capacity agent 250-D, detection of a capacity event at the datacenter 220, detection of a request for monitoring of the capacity of the datacenter 220, and the like), and so forth.

It will be appreciated that the determination by the datacenter capacity agent 250-D that the capacity limit for the datacenter 220 has been reached may be used at the datacenter capacity agent 250-D for various purposes (e.g., for triggering load balancing, triggering auto-scaling, and the like) and, similarly, that the notification from the datacenter capacity agent 250-D that is indicative that the capacity limit for the datacenter 220 has been reached may be used at various higher layers of the hierarchy of capacity agents 250 for various purposes (e.g., for triggering load balancing, triggering auto-scaling, capacity trend analytics, capacity planning, and the like). It will be appreciated that the determination by the datacenter capacity agent 250-D that the capacity limit for the datacenter 220 has been reached may be used for relatively short-term capacity management functions (e.g., load balancing, creating and destroying virtual resources based on current load, and so forth) and for relatively long-term capacity management functions (e.g., long-term capacity planning and so forth).

The datacenter capacity agent 250-D associated with a datacenter 220 may be configured to determine a predicted capacity exhaustion point for the datacenter 220 and send the predicted capacity exhaustion point for the datacenter 220 to the regional capacity agent 250-R with which the datacenter capacity agent 250-D is associated.

The datacenter capacity agent 250-D may determine the predicted capacity exhaustion point for the datacenter 220 based on the ML-based load prediction algorithm and parameters specified in the profile 251-D available to the datacenter capacity agent 250-D.

The datacenter capacity agent 250-D may determine the predicted capacity exhaustion point for the datacenter 220 based on the ML-based load prediction algorithm and parameters by processing predicted capacity exhaustion points of the hosts 210, that are received by the datacenter capacity agent 250-D from the local capacity agents 250-L associated with the hosts 210, using the ML-based load prediction algorithm and parameters. It will be appreciated that this may obviate a need for the datacenter capacity agent 250-D to process KCI information associated with the hosts 210 of the datacenter 220 in order to determine predicted capacity exhaustion point for the datacenter 220 since this processing is performed at the host layer and, thus, is distributed across the local capacity agents 250-L associated with the hosts 210 such that this processing does not need to be repeated at the datacenter layer by the datacenter capacity agent 250-D.

The datacenter capacity agent 250-D may determine the predicted capacity exhaustion point for the datacenter 220 based on the ML-based load prediction algorithm and parameters by processing KCI information of the hosts 210 of the datacenter 220 (e.g., collected KCI information, processed KCI information, and so forth), received by the datacenter capacity agent 250-D from the local capacity agents 250-L associated with the hosts 210, using the ML-based load prediction algorithm and parameters. It will be appreciated that determination of the predicted capacity exhaustion point for the datacenter 220 based on processing of KCI information of the hosts 210 of the datacenter 220 may be performed in place of or in conjunction with use of the predicted capacity exhaustion points of the hosts 210 of the datacenter 220 to determine the predicted capacity exhaustion point of the datacenter 220.

It will be appreciated that the ML-based load prediction algorithm may include any suitable ML-based load prediction algorithm that is configured to support determination of the predicted capacity exhaustion point for the datacenter 220 (e.g., based on ML techniques such as regression, random forest, and so forth) and that the associated ML-based load prediction parameters used by the ML-based load prediction algorithm may include any suitable ML-based load prediction parameters that are configured to support determination of the predicted capacity exhaustion point for the datacenter 220 (e.g., based on parameters such as current load, future load, load threshold, and so forth). It will be appreciated that the ML-based load prediction algorithm may be configured to support determination of the predicted capacity exhaustion point for the datacenter 220 based on information associated with the hosts 210 of the datacenter 220 (e.g., predicted capacity exhaustion points of the hosts 210 received from the local capacity agents 250-L of the hosts 210, KCI information of the hosts 210 received from the local capacity agents 250-L of the hosts 210, and so forth).

It will be appreciated that use of the ML-based load prediction algorithm and parameters by the datacenter capacity agent 250-D of the datacenter 220 to determine the predicted capacity exhaustion point for the datacenter 220 may be further understood from the following examples.

In one example, the parameter for the ML-based load prediction algorithm may include an average predicted capacity exhaustion point parameter. It will be appreciated that the value of the average predicted capacity exhaustion point parameter may be determined by the ML-based load prediction algorithm. The ML-based load prediction algorithm may determine the average predicted capacity exhaustion point of the datacenter 220 based on the processing of the predicted capacity exhaustion points of the hosts 210 received from the local capacity agents 250-L of the hosts 210. The ML-based load prediction algorithm may determine the average predicted capacity exhaustion point of the datacenter 220, based on the processing of the predicted capacity exhaustion points of the hosts 210 received from the local capacity agents 250-L of the hosts 210, using various ML techniques. It will be appreciated that this example may be further understood from the following example.

For example, where the parameter for the ML-based load prediction algorithm includes an average predicted capacity exhaustion point, the average predicted capacity exhaustion point for the datacenter 220 may be determined as follows. In this example, assume, for purposes of simplicity, that the datacenter 220 includes only three hosts 210 subject to capacity management where the three hosts 210 have reported predicted capacity exhaustion points of 2 months, 4 months, and 6 months, respectively. In this example, further assume that the datacenter capacity agent 250-D is configured to support load-balancing and auto-scaling techniques for the hosts 210 that can impact the predicted capacity exhaustion points of the hosts 210. In this example, assume that the ML-based load prediction algorithm determines, based on the processing of the predicted capacity exhaustion points of the hosts 210 and information regarding capabilities that can impact the predicted capacity exhaustion points of the hosts 210, determines that the average predicted capacity exhaustion point for the datacenter 220 is approximately 5 months.

It will be appreciated that, although the foregoing examples primarily are based on use of specific types and numbers of parameters in specific ways to determine the predicted capacity exhaustion point for the datacenter 220, the predicted capacity exhaustion point for the datacenter 220 may be determined by the ML-based load prediction algorithm based on other types of parameters, other numbers of parameters, use of parameters in other ways, and so forth.

The sending of the predicted capacity exhaustion point for the datacenter 220 to the regional capacity agent 250-R with which the datacenter capacity agent 250-D is associated may be performed in various ways. For example, the sending of the predicted capacity exhaustion point for the datacenter 220 to the regional capacity agent 250-R with which the datacenter capacity agent 250-D is associated may be performed using various protocols, message formats, data formats, and so forth.

It will be appreciated that the predicted capacity exhaustion point for the datacenter 220 may be determined and sent to the regional capacity agent 250-R with which the datacenter capacity agent 250-D is associated periodically (e.g., once each hour, once each day, once each month, and so forth), responsive to detection of a condition (e.g., receipt of predicted capacity exhaustion points from local capacity agents 250-L associated with the hosts 210 of the datacenter 220, receipt of a new profile 251-D for the datacenter capacity agent 250-D, detection of a capacity event at the datacenter 220, detection of a request for the predicted capacity exhaustion point for the datacenter 220 to be determined and sent, and the like), and so forth.

It will be appreciated that the predicted capacity exhaustion point for the datacenter 220 may be used at various layers of the hierarchy of capacity agents 250 for various purposes, such as at the datacenter capacity agent 250-D for triggering a notification based on a determination that the predicted capacity exhaustion point for the datacenter 220 has been reached at the datacenter 220, at higher layers of the hierarchy of capacity agents 250 for supporting various capacity management functions (e.g., capacity monitoring, capacity control, capacity trend analytics, capacity planning, and the like), and so forth. It will be appreciated that the predicted capacity exhaustion point for the datacenter 220 may be used for relatively short-term capacity management functions (e.g., load balancing, creating and destroying virtual resources based on current load, and so forth) and for relatively long-term capacity management functions (e.g., long-term capacity planning and so forth).

It will be appreciated that the profiles 251-D available to the datacenter capacity agents 250-D may include less or more (as well as different) information, the datacenter capacity agents 250-D may be configured to perform fewer or more (as well as different) functions based on the profiles 251-D available to the datacenter capacity agents 250-D, and so forth.

The regional capacity agents 250-R operating within the regions 230 are configured to provide capacity management functions (e.g., capacity monitoring for capacity control, capacity prediction for capacity planning, and so forth) based on the profiles 251-R available to the regional capacity agents 250-R, respectively. The regional capacity agents 250-R may be configured to provide capacity management functions for the hosts 210 within the sets of datacenters 220 within the regions 230, capacity management functions for supporting capacity management functions to be performed at higher layers of the hierarchy of capacity agents 250, and so forth.

The profile 251-R available to a regional capacity agent 250-R may include profile information configured to support capacity management functions to be supported by the regional capacity agent 250-R. The profile 251-R available to a regional capacity agent 250-R may include an indication of a set of KCIs to be considered by the regional capacity agent 250-R, a capacity limit of the region 230 with which the regional capacity agent 250-R is associated (e.g., a cumulative capacity limit of the hosts 210 in the datacenters 220 in the region 230 that are under capacity management), and an ML-based load prediction algorithm and parameters (which may be specified as part of the ML-based load prediction algorithm). The profile available to a regional capacity agent 250-R also may include additional information which may be used at the regional layer for performing capacity management functions (e.g., cost information, forecast information, forecast adjustment information, and so forth). The regional capacity agent 250-R may be configured to perform various capacity management functions, including relatively short-term capacity control functions and relatively long-term capacity planning functions, based on the profile 251-R available to the regional capacity agent 250-R.

The regional capacity agent 250-R associated with a region 230 may be configured to collect KCI information for the KCIs specified in the profile 251-R available to the regional capacity agent 250-R to form collected KCI information. The collection of the KCI information for the KCIs specified in the profile 251-R available to the regional capacity agent 250-R may be performed in various ways. For example, the collection of the KCI information for the KCIs specified in the profile 251-R available to the regional capacity agent 250-R may be performed by collecting the KCI information being reported by datacenter capacity agents 250-D associated with datacenters 220 located within the region 230, based on monitoring of traffic (e.g., control traffic, data traffic, and so forth) within the datacenters 220 of the region 230, and so forth.

It will be appreciated that KCI information may be collected for all of the KCIs specified in the profile 251-R available to the regional capacity agent 250-R or for a subset of KCIs specified in the profile 251-R available to the regional capacity agent 250-R.

It will be appreciated that the KCI information for the region 230 may be collected periodically (e.g., once each minute, once every 15 minutes, once each hour, once each day, and so forth), responsive to detection of a condition (e.g., receipt of KCI feeds from datacenter capacity agents 250-D associated with datacenters 220 of the region 230, receipt of a new profile 251-R for the regional capacity agent 250-R, detection of a capacity event within the region 230, detection of a request for new KCI information to be collected and sent, and the like), and so forth.

It will be appreciated that the collected KCI information may be used at various layers of the hierarchy of capacity agents 250 for various purposes, such as at the regional capacity agent 250-R for generating processed KCI information which may be delivered to higher layers of the hierarchy of capacity agents 250, at the regional capacity agent 250-R for monitoring the capacity within the region 230 (and, e.g., raising a capacity limit alarm or performance impact alarm when a capacity limit is reached), at the regional capacity agent 250-R for predicting a potential capacity exhaustion point of the region 230, at higher layers of the hierarchy of capacity agents 250 for supporting various capacity management functions (e.g., capacity monitoring, capacity control, capacity trend analytics, capacity planning, and the like), and so forth. It will be appreciated that the collected KCI information may be used for relatively short-term capacity management functions (e.g., load balancing, creating and destroying virtual resources based on current load, and so forth) and for relatively long-term capacity management functions (e.g., long-term capacity planning and so forth).

The regional capacity agent 250-R associated with a region 230 may be configured to process the collected KCI information (e.g., collected from the hosts 210 within the datacenter 220) to form processed KCI information and send the processed KCI information to the network management system 240 with which the regional capacity agent 250-R is associated.

The processing of the collected KCI information to form the processed KCI information may include various types of processing. For example, the processing of the collected KCI information to form the processed KCI information may include parsing the collected KCI information, aggregating the collected KCI information, formatting the collected KCI information, eliminating redundant KCI information from the collected KCI information, generating summaries of the collected KCI information, and so forth.

The sending of the processed KCI information to the network management system 240 with which the regional capacity agent 250-R is associated may be performed in various ways. For example, the sending of the processed KCI information to the network management system 240 with which the regional capacity agent 250-R is associated may be performed using various protocols, message formats, data formats, and so forth.

It will be appreciated that the processed KCI information for the region 230 may be determined and sent to the network management system 240 with which the regional capacity agent 250-R is associated periodically (e.g., once each minute, once every 15 minutes, once each hour, once each day, and so forth), responsive to detection of a condition (e.g., receipt of KCI feeds from datacenter capacity agents 250-D associated datacenters 220 of the region 230, receipt of a new profile 251-R for the regional capacity agent 250-R, detection of a capacity event within the region 230, detection of a request for the processed KCI information for the region 230 to be determined and sent, and the like), and so forth.

It will be appreciated that the processed KCI information may be used at various layers of the hierarchy of capacity agents 250 for various purposes, such as at the regional capacity agent 250-R for monitoring the capacity of the region 230, at the regional capacity agent 250-R for predicting a potential capacity exhaustion point of the region 230, at higher layers of the hierarchy of capacity agents 250 for supporting various capacity management functions (e.g., capacity monitoring, capacity control, capacity trend analytics, capacity planning, and the like), and so forth. It will be appreciated that the processed KCI information may be used for relatively short-term capacity management functions (e.g., load balancing, creating and destroying virtual resources based on current load, and so forth) and for relatively long-term capacity management functions (e.g., long-term capacity planning and so forth).

The regional capacity agent 250-R associated with a region 230 may be configured to monitor a measured capacity of the region 230 based on the KCIs specified in the profile 251-R available to the regional capacity agent 250-R and evaluate the measured capacity of the region 230 based on the capacity limit specified in profile 251-R available to the regional capacity agent 250-R for determining whether to send a notification to the network management system 240 with which the regional capacity agent 250-R is associated.

The regional capacity agent 250-R may monitor the measured capacity of the region 230 based on the KCIs specified in the profile 251-R by processing the collected KCI information for the KCIs specified in the profile 251-R available to the regional capacity agent 250-R, the processed KCI information generated based on processing of the collected KCI information for the KCIs specified in the profile 251-R available to the regional capacity agent 250-R, and so forth. It will be appreciated that the measured capacity and the capacity limit used for evaluation of the measured capacity are evaluated at the regional layer and, thus, are based on the aggregation of capacity information (e.g., KCI feeds) received from the hosts 210 of the datacenters 220 of the region 230. It will be appreciated that the measured capacity and the capacity limit used for evaluation of the measured capacity may be based on one or more KCIs (e.g., a single KCI, a combination of KCIs, a weighted combination of KCIs, or the like) specified in the profile 251-R available to the regional capacity agent 250-R. For example, the measured capacity and the capacity limit used for evaluation of the measured capacity may be based on CPU utilization, memory utilization, traffic throughput, a combination of CPU utilization and traffic throughput, a combination of memory utilization and traffic throughput, and so forth.

The regional capacity agent 250-R may send a notification to the network management system 240 based on a determination that the measured capacity of the region 230 has reached the capacity limit (e.g., equals or exceeds the capacity limit). The notification may include a notification message, an alarm, or other suitable message or indicator configured to indicate to the network management system 240 that the measured capacity of the region 230 has reached the capacity limit specified for the region 230. It will be appreciated that the network management system 240, upon receiving a notification from the regional capacity agent 250-R that is indicative that the capacity limit for the region 230 has been reached, may initiate one or more management actions (e.g., initiating a load-balancing operation within the region 230 or across regions 230, initiating an auto-scaling operation within the region 230 or across regions 230, sending the notification or other indication of the capacity limit being reached for the region 230 to one or more other entities (e.g., one or more management systems or the like) for use by the one or more entities in initiating one or more management actions, and so forth).

It will be appreciated that the monitoring of the capacity of the region 230 may be performed periodically (e.g., once each minute, once every 15 minutes, once each hour, and so forth), responsive to detection of a condition (e.g., receipt of KCI feeds from datacenter capacity agents 250-D associated with the datacenters 220 within the region 230, receipt of a new profile 251-R for the regional capacity agent 250-R, detection of a capacity event within the region 230, detection of a request for monitoring of the capacity of the region 230 or one or more datacenters 220 of the region 230, and the like), and so forth.

It will be appreciated that the determination by the regional capacity agent 250-R that the capacity limit for the region 230 has been reached may be used at the regional capacity agent 250-R for various purposes (e.g., for triggering load balancing, triggering auto-scaling, and the like) and, similarly, that the notification from the regional capacity agent 250-R that is indicative that the capacity limit for the region 230 has been reached may be used at various higher layers of the hierarchy of capacity agents 250 for various purposes (e.g., for triggering load balancing, triggering auto-scaling, capacity trend analytics, capacity planning, and the like). It will be appreciated that the determination by the regional capacity agent 250-R that the capacity limit for the region 230 has been reached may be used for relatively short-term capacity management functions (e.g., load balancing, creating and destroying virtual resources based on current load, and so forth) and for relatively long-term capacity management functions (e.g., long-term capacity planning and so forth).

The regional capacity agent 250-R associated with a region 230 may be configured to determine a predicted capacity exhaustion point for the region 230 and send the predicted capacity exhaustion point for the region 230 to the network management system 240 with which the regional capacity agent 250-R is associated.

The regional capacity agent 250-R may determine the predicted capacity exhaustion point for the region 230 based on the ML-based load prediction algorithm and parameters specified in the profile 251-R available to the regional capacity agent 250-R.

The regional capacity agent 250-R may determine the predicted capacity exhaustion point for the region 230 based on the ML-based load prediction algorithm and parameters by processing predicted capacity exhaustion points of the datacenters 220, that are received by the regional capacity agent 250-R from the datacenter capacity agents 250-D associated with the datacenters 220, using the ML-based load prediction algorithm and parameters. It will be appreciated that this may obviate a need for the regional capacity agent 250-R to process KCI information associated with the datacenters 220 of the region 230 in order to determine predicted capacity exhaustion point for the region 230 since this processing is performed at the host layer and/or the datacenter layer and, thus, is distributed across the local capacity agents 250-L associated with the hosts 210 and/or the datacenter capacity agents 250-D associated with the datacenters 220 of the region 230, such that this processing does not need to be repeated at the regional layer by the regional capacity agent 250-R.

The regional capacity agent 250-R may determine the predicted capacity exhaustion point for the region 230 based on the ML-based load prediction algorithm and parameters by processing KCI information of the datacenters 220 of the region 230 (e.g., collected KCI information, processed KCI information, and so forth), received by the regional capacity agent 250-R from the datacenter capacity agents 250-D associated with the datacenters 220, using the ML-based load prediction algorithm and parameters. It will be appreciated that determination of the predicted capacity exhaustion point for the region 230 based on processing of KCI information of the datacenters 220 of the region 230 may be performed in place of or in conjunction with use of the predicted capacity exhaustion points of the datacenters 220 of the region 230 to determine the predicted capacity exhaustion point of the region 230.

It will be appreciated that the ML-based load prediction algorithm may include any suitable ML-based load prediction algorithm that is configured to support determination of the predicted capacity exhaustion point for the region 230 (e.g., based on ML techniques such as regression, random forest, and so forth) and that the associated ML-based load prediction parameters used by the ML-based load prediction algorithm may include any suitable ML-based load prediction parameters that are configured to support determination of the predicted capacity exhaustion point for the region 230 (e.g., based on parameters such as average predicted capacity exhaustion point, weighted-average predicted capacity exhaustion point, and so forth). It will be appreciated that the ML-based load prediction algorithm may be configured to support determination of the predicted capacity exhaustion point for the region 230 based on information from the datacenter capacity agents 250-D of the datacenter 220 (e.g., predicted capacity exhaustion points of the datacenters 220 received from the datacenter capacity agents 250-D of the datacenters 220, KCI information of the datacenters 220 received from the datacenter capacity agents 250-D of the datacenters 220, and so forth).

It will be appreciated that use of the ML-based load prediction algorithm and parameters by the regional capacity agent 250-R of the region 230 to determine the predicted capacity exhaustion point for the region 230 may be further understood from the following examples.

In one example, the parameter for the ML-based load prediction algorithm may include an average predicted capacity exhaustion point parameter. It will be appreciated that the value of the average predicted capacity exhaustion point parameter may be determined by the ML-based load prediction algorithm. The ML-based load prediction algorithm may determine the average predicted capacity exhaustion point of the region 230 based on the processing of the predicted capacity exhaustion points of the datacenters 220 received from the datacenter capacity agents 250-D of the datacenters 220. The ML-based load prediction algorithm may determine the average predicted capacity exhaustion point of the region 230, based on the processing of the predicted capacity exhaustion points of the datacenters 220 received from the datacenter capacity agents 250-D of the datacenters 220, using various ML techniques. It will be appreciated that this example may be further understood from the following example.

For example, where the parameter for the ML-based load prediction algorithm includes an average predicted capacity exhaustion point, the average predicted capacity exhaustion point for the region 230 may be determined as follows. In this example, assume, for purposes of simplicity, that the region includes four datacenters 220 including hosts 210 subject to capacity management where the four datacenters 220 have reported predicted capacity exhaustion points of 3 months, 5 months, 5 months, and 7 months, respectively. In this example, further assume that the regional capacity agent 250-R is configured to support load-balancing and auto-scaling techniques for the hosts 210 that can impact the predicted capacity exhaustion points of the datacenters 220. In this example, assume that the ML-based load prediction algorithm determines, based on the processing of the predicted capacity exhaustion points of the datacenters 220 and information regarding capabilities that can impact the predicted capacity exhaustion points of the datacenters 220, determines that the average predicted capacity exhaustion point for the region is approximately 6 months.

It will be appreciated that, although the foregoing examples primarily are based on use of specific types and numbers of parameters in specific ways to determine the predicted capacity exhaustion point for the region 230, the predicted capacity exhaustion point for the region 230 may be determined by the ML-based load prediction algorithm based on other types of parameters, other numbers of parameters, use of parameters in other ways, and so forth.

The sending of the predicted capacity exhaustion point for the region 230 to the network management system 240 with which the regional capacity agent 250-R is associated may be performed in various ways. For example, the sending of the predicted capacity exhaustion point for the region 230 to the network management system 240 with which the regional capacity agent 250-R is associated may be performed using various protocols, message formats, data formats, and so forth.

It will be appreciated that the predicted capacity exhaustion point for the region 230 may be determined and sent to the network management system 240 with which the regional capacity agent 250-R is associated periodically (e.g., once each hour, once each day, once each month, and so forth), responsive to detection of a condition (e.g., receipt of predicted capacity exhaustion points from datacenter capacity agents 250-D associated with the datacenters 220 of the region 230, receipt of a new profile 251-R for the regional capacity agent 250-R, detection of a capacity event for the region 230, detection of a request for the predicted capacity exhaustion point for the region 230 to be determined and sent, and the like), and so forth.

It will be appreciated that the predicted capacity exhaustion point for the region 230 may be used at various layers of the hierarchy of capacity agents 250 for various purposes, such as at the regional capacity agent 250-R for triggering a notification based on a determination that the predicted capacity exhaustion point for the region 230 has been reached at the region 230, at higher layers of the hierarchy of capacity agents 250 for supporting various capacity management functions (e.g., capacity monitoring, capacity control, capacity trend analytics, capacity planning, and the like), and so forth. It will be appreciated that the predicted capacity exhaustion point for the region 230 may be used for relatively short-term capacity management functions (e.g., load balancing, creating and destroying virtual resources based on current load, and so forth) and for relatively long-term capacity management functions (e.g., long-term capacity planning and so forth).

It will be appreciated that the profiles 251-R available to the regional capacity agent 250-R may include less or more (as well as different) information, the regional capacity agent 250-R may be configured to perform fewer or more (as well as different) functions based on the profiles 251-R available to the regional capacity agent 250-R, and so forth.

It will be appreciated that the profiles 251 available to the capacity agents 250 may be updated at the capacity agents 250 periodically, in response to various conditions (e.g., updates to profile information sourced to provide the profiles 251, detection of various conditions by various capacity agents 250, and the like, and so forth.

It will be appreciated that the capacity agents 250 may be configured to support various other capacity management functions, may be configured to cooperate to provide various other capacity management functions, and so forth.

It will be appreciated that, although primarily presented in FIG. 2 with respect to a hierarchy of agents 250 that includes a specific number of hierarchical layers (namely, three layers) arranged at particular layers of the network hierarchy (namely, at the host, datacenter, and regional layers), the hierarchy of agents 250 may include various other numbers of hierarchical layers (e.g., fewer or more), the hierarchy of agents 250 may be arranged at various of layers of the network hierarchy (e.g., the lowest layer may be at the VM layer, without using a host layer, the lowest layer may be at the datacenter layer on a per datacenter basis, the highest layer may be at a network layer, and the like), and so forth.

The network management system 240 may be configured to perform various management functions for the system 200. The network management system 240 may be configured to perform various capacity management functions for hosts 210 of the datacenters 220 of the regions 230. The network management system 240 may be configured to received KCI information from the regional capacity agents 250-R of the regions 230 and perform various capacity management functions based on the KCI information (e.g., short-term capacity control functions such as instantiating or terminating VCs or VMs, long-term capacity planning functions, and so forth). The network management system 240 may be configured to received capacity limit notifications from the regional capacity agents 250-R of the regions 230 and perform various capacity management functions based on the capacity limit notifications (e.g., initiating load-balancing operations, auto-scaling operations, capacity planning operations, and so forth). The network management system 240 may be configured to receive predicted capacity exhaustion point information from the regional capacity agents 250-R of the regions 230 and perform various capacity management functions based on the predicted capacity exhaustion point information (e.g., capacity control functions such as load-balancing and auto-scaling, capacity planning functions for planning future capacity for the various datacenters 220 of the various regions 230, and so forth). The network management system 240 may be configured to perform various capacity management functions for the system 200 based on various combinations of such information which may be received by the network management system 240 from the regional capacity agents 250-R of the regions 230 (e.g., based on one or more of KCI information, capacity limit notifications, predicted capacity exhaustion point information, and so forth). It will be appreciated that the network management system 240 may be configured to perform various other capacity management functions for the system 200.

It will be appreciated that system 200 of FIG. 2 may be configured to support various other functions discussed herein with respect to the system 100 of FIG. 1 and, similarly, that the system 100 of FIG. 1 may be configured to support various other functions discussed herein with respect to the system 200 of FIG. 2.

It should be noted that the system 200, like the system 100, has been simplified. Thus, it should be noted that the system 200 may be implemented in a different form than that which is illustrated in FIG. 2, without altering the scope of the present disclosure.

Figure 3:
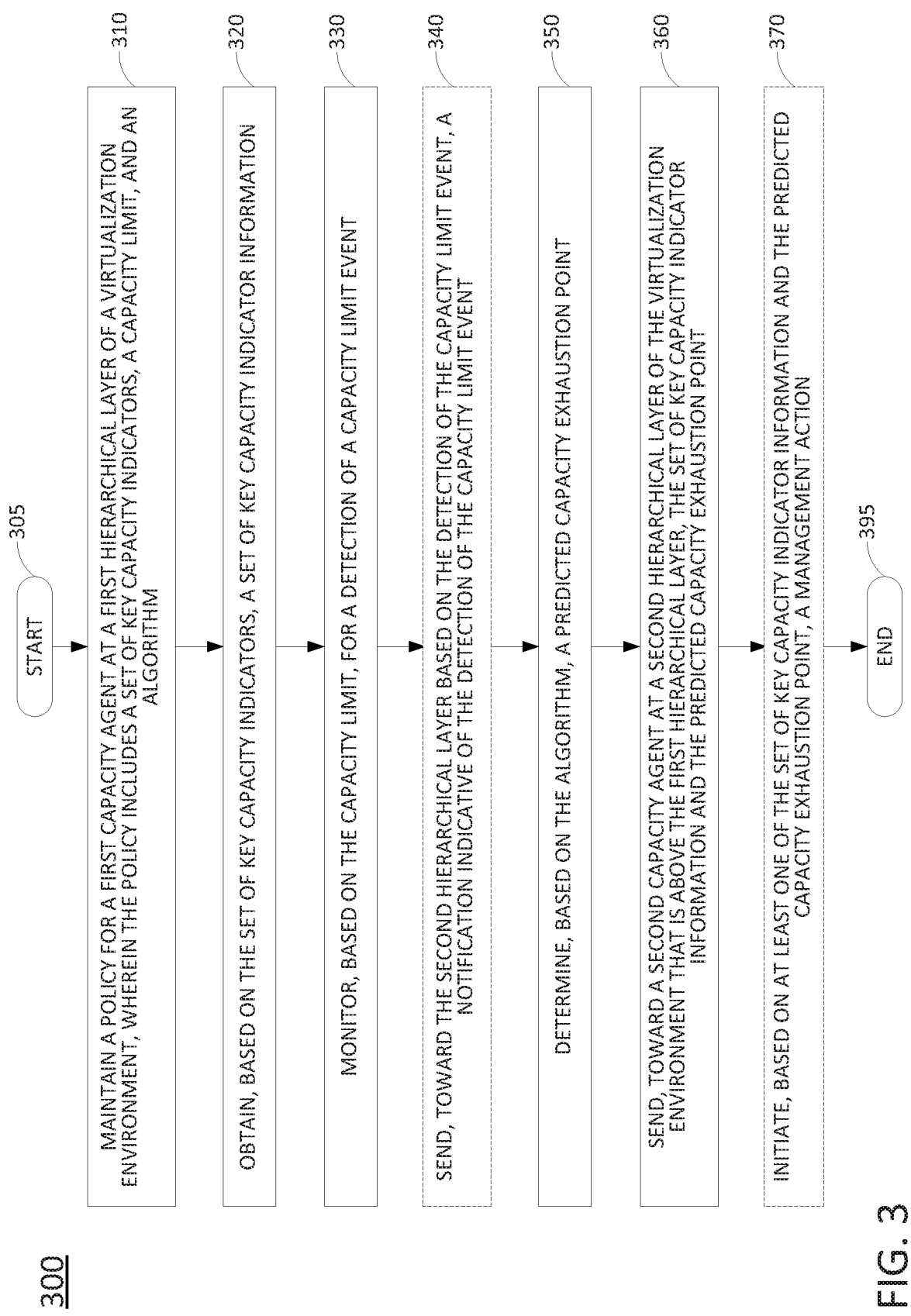
FIG. 3 illustrates a flowchart of an example method for supporting hierarchical capacity management in a virtualization environment, in accordance with the present disclosure.

FIG. 3 illustrates a flowchart of an example method for supporting hierarchical capacity management in a virtualization environment, in accordance with the present disclosure. In one example, the method 300 is performed by a component of the system 100 of FIG. 1 or a component of the system 200 of FIG. 2. In one example, the steps, functions, or operations of method 300 may be performed by a computing system 400 as described in connection with FIG. 4 below. For instance, the computing system 400 may represent any one or more components of the system 100 of FIG. 1 or any one or more components of the system 200 of FIG. 2 that is/are configured to perform the steps, functions, and/or operations of the method 300. Similarly, in one example, the steps, functions, and/or operations of method 300 may be performed by a processing system including one or more computing devices collectively configured to perform various steps, functions, and/or operations of the method 300. For instance, multiple instances of the computing system 400 may collectively function as a processing system. For illustrative purposes, the method 300 is described in greater detail below in connection with an example performed by a processing system. The method 300 begins in step 305 and proceeds to step 310.

At step 310, the processing system may maintain a policy for a first capacity agent at a first hierarchical layer of a virtualization environment, wherein the policy includes a set of key capacity indicators, a capacity limit, and an algorithm. In one example, the set of key capacity indicators includes one or more of a CPU utilization indicator, a memory utilization indicator, a storage utilization indicator, a throughput indicator, and so forth. In one example, the algorithm is a machine learning algorithm.

At step 320, the processing system may obtain, based on the set of key capacity indicators, a set of key capacity indicator information. In one example, the set of key capacity indicator information is obtained based on monitoring of a key capacity indicator feed generated at the first hierarchical layer. In one example, the set of key capacity indicator information is obtained based on monitoring of a key capacity indicator feed received from a third hierarchical layer of the virtualization environment that is below the first hierarchical layer. In one example, the set of key capacity indicator information is obtained by receiving a set of collected key capacity indicator information and processing the set of collected key capacity indicator information to provide the set of key capacity indicator information. In one example, the processing of the set of collected key capacity indicator information to provide the set of key capacity indicator information includes at least one of aggregating at least a portion of the set of collected key capacity indicator information, removing at least a portion of the set of collected key capacity indicator information, formatting at least a portion of the set of the collected key capacity indicator information, and summarizing at least a portion of the set of collected key capacity indicator information.

At step 330, the processing system may monitor, based on the capacity limit, for a detection of a capacity limit event. In one example, monitoring for the detection of the capacity limit event includes determining, by the processing system based on the set of key capacity indicator information, a measured capacity of the first hierarchical layer and determining, by the processing system, whether the measured capacity of the first hierarchical layer satisfies the capacity limit.

At step 340 (an optional step), the processing system may send, toward the second hierarchical layer based on the detection of the capacity limit event, a notification indicative of the detection of the capacity limit event. It is noted that this step may be considered to be optional since it is possible that a capacity limit event may not be detected. In one example, the notification indicative of the detection of the capacity limit event is sent toward at least one of the second capacity agent, a load-balancing agent, or an auto-scaling agent.

At step 350, the processing system may determine, based on the algorithm, a predicted capacity exhaustion point. In one example, determining the predicted capacity exhaustion point includes obtaining, by the processing system, a set of input information and determining, by the processing system based on processing of the set of input information using the algorithm, the predicted capacity exhaustion point. In one example, the set of input information includes at least a portion of the set of key capacity indicator information and processing the set of input information to determine the predicted capacity exhaustion point includes computing, by the processing system using the algorithm and based on the set of input information, a current load at the first hierarchical layer, computing, by the processing system using the algorithm and based on the current load at the first hierarchical layer, a predicted future load at the first hierarchical layer, and determining, by the processing system using the algorithm and based on the predicted future load at the first hierarchical layer and a load threshold for the first hierarchical layer, the predicted capacity exhaustion point. In one example, the set of input information includes a set of predicted capacity exhaustion points received from a third hierarchical layer of the virtualization environment that is below the first hierarchical layer.

At step 360, the processing system may send, toward a second capacity agent at a second hierarchical layer of the virtualization environment that is above the first hierarchical layer, the set of key capacity indicator information and the predicted capacity exhaustion point.

At step 370 (an optional step), the processing system may initiate, based on at least one of the set of key capacity indicator information and the predicted capacity exhaustion point, a management action. It is noted that this step may be considered to be optional since it is possible that a capacity agent reports information without initiating a management action based on such information (e.g., depending on the hierarchical layer). In one example, the management action includes at least one of a capacity control action or a capacity planning action.

Following step 370, the method 300 proceeds to step 395 where the method 300 ends.

It should be noted that the method 300 may be expanded to include additional steps, or may be modified to replace steps with different steps, to combine steps, to omit steps, to perform steps in a different order, and so forth. For instance, in one example the processing system may repeat one or more steps of the method 300 to update the policy, obtain additional key capacity indicator information, monitor for detection of a capacity limit event, obtain additional predicted capacity exhaustion point information, send additional key capacity indicator information and/or additional predicted capacity exhaustion point information to one or more other layers of the virtualization environment, and so forth. It will be appreciated that these and other modifications are all contemplated within the scope of the present disclosure.

It is noted that, although not expressly specified above, one or more steps of the method 300 may include a storing, displaying, and/or outputting steps as required for a particular application. In other words, any data, records, fields, and/or intermediate results discussed in the method can be stored, displayed, and/or outputted to another device as required for a particular application. Furthermore, operations, steps, or blocks in FIG. 3 that recite a determining operation or involve a decision do not necessarily require that both branches of the determining operation be practiced. In other words, one of the branches of the determining operation can be deemed as an optional step. Thus, the use of the term "optional step" is intended to only reflect different variations of a particular illustrative example and is not intended to indicate that steps not labelled as optional steps to be deemed to be essential steps. Furthermore, operations, steps or blocks of the above described method(s) can be combined, separated, and/or performed in a different order from that described above, without departing from the examples of the present disclosure.

It is noted that various examples of the present disclosure may support various aspects of providing hierarchical capacity management. For example, various examples of the present disclosure may be configured to enable capacity management as a service. For example, various examples of the present disclosure may be configured to make cloud resource management systems more scalable and cost efficient. For example, various examples of the present disclosure may be configured in a manner tending to avoid capacity and configuration data movement from endpoints to centralized locations (although such movement may still be supported), enable natural coupling with network cloud design as well as load-balancing and auto-scaling, support handling of sudden load surges (e.g., at venues, on particular days of the year, and so forth) and long-term load growth and associated planning, support various combinations of capacity management tasks with performance management flow, and so forth. It is noted that various examples of the present disclosure may support various other aspects of providing hierarchical capacity management.

It should be noted that, as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may include a computing device including one or more processors or cores or multiple computing devices collectively configured to perform various steps, functions, and/or operations in accordance with the present disclosure.

Figure 4:
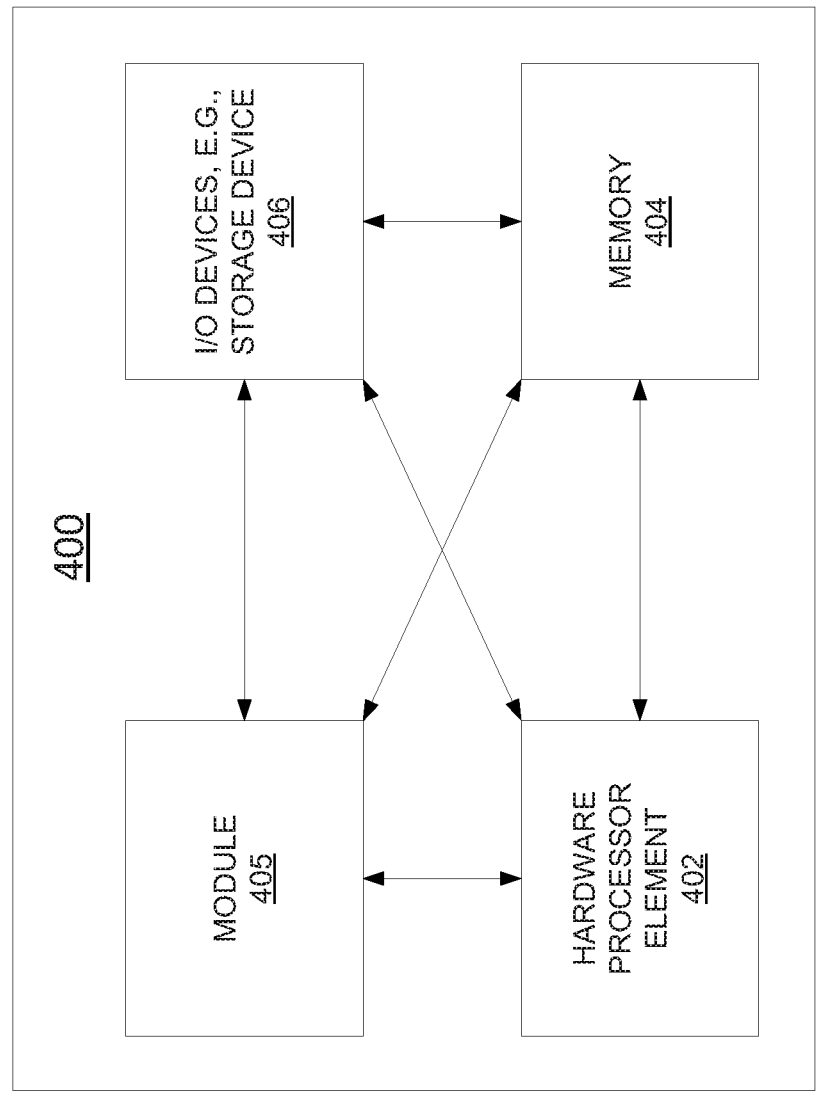
FIG. 4 illustrates a high-level block diagram of a computing device specifically programmed to perform the steps, functions, blocks and/or operations described herein.

FIG. 4 depicts a high-level block diagram of a computing system 400 (e.g., a computing device or processing system) specifically programmed to perform the functions described herein. For example, any one or more components or devices illustrated in FIG. 1 or FIG. 2, or described in connection with the method 300 of FIG. 3, may be implemented as the computing system 400. As depicted in FIG. 4, the computing system 400 comprises a hardware processor element 402 (e.g., comprising one or more hardware processors, which may include one or more microprocessor(s), one or more central processing units (CPUs), and/or the like, where the hardware processor element 402 may also represent one example of a "processing system" as referred to herein), a memory 404 (e.g., random access memory (RAM), read only memory (ROM), a disk drive, an optical drive, a magnetic drive, a Universal Serial Bus (USB) drive, and the like), a module 405 for supporting hierarchical capacity management, and various input/output devices 406 (e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It is noted that, although only one hardware processor element 402 is shown, the computing system 400 may employ a plurality of hardware processor elements. Furthermore, although only one computing device is shown in FIG. 4, if the method(s) as discussed above is implemented in a distributed or parallel manner for a particular illustrative example, e.g., the steps of the above method(s) or the entire method(s) are implemented across multiple or parallel computing devices, then the computing system 400 of FIG. 4 may represent each of those multiple or parallel computing devices. Furthermore, one or more hardware processor elements 402 can be utilized in supporting a virtualized or shared computing environment. The virtualized computing environment may support one or more virtual machines which may be configured to operate as computers, servers, or other computing devices. In such virtualized virtual machines, hardware components such as hardware processors and computer-readable storage devices may be virtualized or logically represented. The hardware processor element 402 can also be configured or programmed to cause other devices to perform one or more operations as discussed above. In other words, the hardware processor element 402 may serve the function of a central controller directing other devices to perform the one or more operations as discussed above.

It is noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer-readable instructions pertaining to the method(s) discussed above can be used to configure one or more hardware processor elements to perform the steps, functions and/or operations of the above disclosed method(s). In one example, instructions and data for the module 405 for supporting hierarchical capacity management (e.g., a software program comprising computer-executable instructions) can be loaded into memory 404 and executed by hardware processor element 402 to implement the steps, functions or operations as discussed above in connection with the example method 300. Furthermore, when a hardware processor element executes instructions to perform operations, this could include the hardware processor element performing the operations directly and/or facilitating, directing, or cooperating with one or more additional hardware devices or components (e.g., a co-processor and the like) to perform the operations.

The hardware processor element 402 executing the computer-readable instructions relating to the above described method(s) can be perceived as a programmed processor or a specialized processor. As such, the module 405 for supporting hierarchical capacity management (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium may comprise a physical device, a hardware device, or a device that is discernible by the touch. More specifically, the computer-readable storage device or medium may comprise any physical devices that provide the ability to store information such as instructions and/or data to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method, comprising:
    maintaining, by a processing system including at least one processor, a policy for a first capacity agent at a first hierarchical layer of a virtualization environment, wherein the policy includes a set of key capacity indicators, a capacity limit, and an algorithm, wherein the first capacity agent is distinct from the algorithm, wherein the first hierarchical layer is a datacenter layer comprising a plurality of datacenters, wherein the first capacity agent is for a first datacenter of the plurality of datacenters, and wherein the first datacenter comprises a plurality of hosts;
    obtaining, by the processing system based on the set of key capacity indicators, a set of key capacity indicator information;
    monitoring, by the processing system based on the capacity limit, for a detection of a capacity limit event;
    determining, by the processing system based on the algorithm, a predicted capacity exhaustion point; and
    sending in response to the detection of the capacity limit event, by the processing system toward a second capacity agent at a second hierarchical layer of the virtualization environment that is above the first hierarchical layer in a layer hierarchy, the set of key capacity indicator information and the predicted capacity exhaustion point, wherein the second hierarchical layer is a regional layer comprising a plurality of regions, wherein the second capacity agent is for a first region of the plurality of regions, and wherein the first region comprises at least a portion of the plurality of datacenters including the first datacenter.

2. The method of claim 1, wherein the set of key capacity indicator information is obtained based on monitoring of a key capacity indicator feed generated at the first hierarchical layer.

3. The method of claim 1, wherein the set of key capacity indicator information is obtained based on monitoring of a key capacity indicator feed received from a third hierarchical layer of the virtualization environment that is below the first hierarchical layer in the layer hierarchy.

4. The method of claim 1, wherein the set of key capacity indicator information is obtained by receiving a set of collected key capacity indicator information and processing the set of collected key capacity indicator information to provide the set of key capacity indicator information.

5. The method of claim 4, wherein the processing of the set of collected key capacity indicator information to provide the set of key capacity indicator information includes at least one of: aggregating at least a portion of the set of collected key capacity indicator information, removing at least a portion of the set of collected key capacity indicator information, formatting at least a portion of the set of the collected key capacity indicator information, or summarizing at least a portion of the set of collected key capacity indicator information.

6. The method claim 1, wherein the monitoring for the detection of the capacity limit event comprises:
    determining, by the processing system based on the set of key capacity indicator information, a measured capacity of the first hierarchical layer; and
    determining, by the processing system, whether the measured capacity of the first hierarchical layer satisfies the capacity limit.

7. The method of claim 1, further comprising:
    sending, by the processing system toward the second hierarchical layer based on the detection of the capacity limit event, a notification indicative of the detection of the capacity limit event.

8. The method of claim 7, wherein the notification indicative of the detection of the capacity limit event is sent toward at least one of: the second capacity agent, a load-balancing agent, or an auto-scaling agent.

9. The method of claim 1, wherein the determining the predicted capacity exhaustion point comprises:
    obtaining, by the processing system, a set of input information; and
    determining, by the processing system based on processing of the set of input information using the algorithm, the predicted capacity exhaustion point.

10. The method of claim 9, wherein the set of input information comprises at least a portion of the set of key capacity indicator information.

11. The method of claim 10, wherein the processing the set of input information to determine the predicted capacity exhaustion point comprises:
- computing, by the processing system using the algorithm and based on the set of input information, a current load at the first hierarchical layer;
- computing, by the processing system using the algorithm and based on the current load at the first hierarchical layer, a predicted future load at the first hierarchical layer; and
- determining, by the processing system using the algorithm and based on the predicted future load at the first hierarchical layer and a load threshold for the first hierarchical layer, the predicted capacity exhaustion point.

12. The method of claim 9, wherein the set of input information comprises a set of predicted capacity exhaustion points received from a third hierarchical layer of the virtualization environment that is below the first hierarchical layer.

13. The method of claim 1, wherein the algorithm comprises a machine learning algorithm.

14. The method of claim 1, further comprising:
- initiating, by the processing system based on at least one of the set of key capacity indicator information and the predicted capacity exhaustion point, a management action.

15. The method of claim 14, wherein the management action comprises at least one of: a capacity control action or a capacity planning action.

16. The method of claim 1, wherein the virtualization environment further includes a host layer comprising the plurality of hosts of the first datacenter and a plurality of additional hosts of the plurality of datacenters, wherein the host layer is below the first hierarchical layer in the layer hierarchy.

17. The method of claim 1, wherein the virtualization environment further includes a management system layer that is above the first hierarchical layer in the layer hierarchy.

18. An apparatus, comprising:
- a processing system including at least one processor; and
- a computer-readable medium storing instructions which, when executed by the processing system, cause the processing system to perform operations, the operations comprising:
  - maintaining a policy for a first capacity agent at a first hierarchical layer of a virtualization environment, wherein the policy includes a set of key capacity indicators, a capacity limit, and an algorithm, wherein the first capacity agent is distinct from the algorithm, wherein the first hierarchical layer is a datacenter layer comprising a plurality of datacenters, wherein the first capacity agent is for a first datacenter of the plurality of datacenters, and wherein the first datacenter comprises a plurality of hosts;
  - obtaining, based on the set of key capacity indicators, a set of key capacity indicator information;
  - monitoring, based on the capacity limit, for a detection of a capacity limit event;
  - determining, based on the algorithm, a predicted capacity exhaustion point; and
  - sending in response to the detection of the capacity limit event, toward a second capacity agent at a second hierarchical layer of the virtualization environment that is above the first hierarchical layer in a layer hierarchy, the set of key capacity indicator information and the predicted capacity exhaustion point, wherein the second hierarchical layer is a regional layer comprising a plurality of regions, wherein the second capacity agent is for a first region of the plurality of regions, and wherein the first region comprises at least a portion of the plurality of datacenters including the first datacenter.

19. A non-transitory computer-readable medium storing instructions which, when executed by a processing system including at least one processor, cause the processing system to perform operations, the operations comprising:
- maintaining a policy for a first capacity agent at a first hierarchical layer of a virtualization environment, wherein the policy includes a set of key capacity indicators, a capacity limit, and an algorithm, wherein the first capacity agent is distinct from the algorithm, wherein the first hierarchical layer is a datacenter layer comprising a plurality of datacenters, wherein the first capacity agent is for a first datacenter of the plurality of datacenters, and wherein the first datacenter comprises a plurality of hosts;
- obtaining, based on the set of key capacity indicators, a set of key capacity indicator information;
- monitoring, based on the capacity limit, for a detection of a capacity limit event;
- determining, based on the algorithm, a predicted capacity exhaustion point; and
- sending in response to the detection of the capacity limit event, toward a second capacity agent at a second hierarchical layer of the virtualization environment that is above the first hierarchical layer in a layer hierarchy, the set of key capacity indicator information and the predicted capacity exhaustion point, wherein the second hierarchical layer is a regional layer comprising a plurality of regions, wherein the second capacity agent is for a first region of the plurality of regions, and wherein the first region comprises at least a portion of the plurality of datacenters including the first datacenter.

20. The non-transitory computer-readable medium of claim 19, wherein the set of key capacity indicator information is obtained based on monitoring of a key capacity indicator feed generated at the first hierarchical layer.

* * * * *